(12) United States Patent
Kimura et al.

(10) Patent No.: US 12,283,723 B2
(45) Date of Patent: Apr. 22, 2025

(54) PROTECTING DEVICE AND BATTERY PACK

(71) Applicant: DEXERIALS CORPORATION, Tochigi (JP)

(72) Inventors: Yuji Kimura, Tochigi (JP); Chisato Komori, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 601 days.

(21) Appl. No.: 17/602,629

(22) PCT Filed: Mar. 25, 2020

(86) PCT No.: PCT/JP2020/013405
§ 371 (c)(1),
(2) Date: Oct. 8, 2021

(87) PCT Pub. No.: WO2020/209071
PCT Pub. Date: Oct. 15, 2020

(65) Prior Publication Data
US 2022/0200111 A1    Jun. 23, 2022

(30) Foreign Application Priority Data

Apr. 10, 2019  (JP) .................................. 2019-074956

(51) Int. Cl.
*H01M 50/581*    (2021.01)
*H01H 85/055*    (2006.01)
(Continued)

(52) U.S. Cl.
CPC ........ *H01M 50/581* (2021.01); *H01H 85/055* (2013.01); *H01H 85/20* (2013.01);
(Continued)

(58) Field of Classification Search
CPC ............. H01M 50/581; H01M 10/482; H01M 2200/103; H01H 85/055; H01H 85/20; H02H 3/20; H02H 7/18
See application file for complete search history.

(56) References Cited

FOREIGN PATENT DOCUMENTS

| JP | 2014-032770 A | 2/2014 |
|----|---------------|--------|
| JP | 2015-225786 A | 12/2015 |

(Continued)

OTHER PUBLICATIONS

Kimura et al., WO 2014021157 A1; WIPO machine translation, 2014 (Year: 2014).*

(Continued)

*Primary Examiner* — Adam A Arciero
(74) *Attorney, Agent, or Firm* — Paratus Law Group, PLLC

(57) ABSTRACT

To provide a protecting device and a battery pack using the same, which are less likely to cause a spark even when a high voltage is applied and can safely and quickly interrupt the current path. A protecting device includes: an insulating substrate 2; a fuse element 3; a heat-generator 4 which generates heat to blow the fuse element 3; a heat-generator feeding electrode 5 which serves as a power-feeding terminal to the heat-generator 4; an insulating layer 6 which covers the heat-generator 4; and a heat-generator lead-out electrode 7 which is formed along the heat-generator 4 on the insulating layer 6 and holds the melted conductor 3a of the fuse element 3, wherein, when the heat-generator 4 is energized, the heat-generator feeding electrode 5 side thereof works as a high potential portion and the heat-generator lead-out electrode 7 side thereof works as a low potential portion, and in the heat-generator lead-out electrode 7, an overlapping area in which a distal end portion 7a extending in the high potential portion side of the heat-
(Continued)

generator 4 overlaps the heat-generator 4 is smaller than an overlapping area in which a proximal end portion 7*b* extending in the low potential portion side of heat-generator 4 overlaps the heat-generator 4.

13 Claims, 28 Drawing Sheets

(51) Int. Cl.
*H01H 85/20* (2006.01)
*H01M 10/48* (2006.01)
*H01M 50/249* (2021.01)
*H01M 50/284* (2021.01)
*H02H 3/20* (2006.01)
*H02H 7/18* (2006.01)

(52) U.S. Cl.
CPC ......... *H01M 10/48* (2013.01); *H01M 10/482* (2013.01); *H01M 50/284* (2021.01); *H02H 3/20* (2013.01); *H02H 7/18* (2013.01); *H01M 50/249* (2021.01); *H01M 2200/103* (2013.01)

(56) References Cited

FOREIGN PATENT DOCUMENTS

| JP | 2018-078046 A | 5/2018 |
| JP | 2018-156959 A | 10/2018 |
| TW | 201419351 A | 5/2014 |
| TW | 201545194 A | 12/2015 |
| WO | WO 2014/021157 A1 | 2/2014 |

OTHER PUBLICATIONS

Kimura et al., JP 2015-225786 A Espacenet machine translation, 2015 (Year: 2015).*
Kimura et al., JP 2018-156959 A Espacenet machine translation, 2018 (Year: 2018).*
Jun. 23, 2023, Korean Office Action issued for related KR Application No. 10-2021-7032503.
Jul. 10, 2023, Taiwanese Office Action issued for related TW Application No. 109111746.
Jul. 19, 2024, Japanese Office Action issued for related JP Application No. 202080027695.6.

* cited by examiner

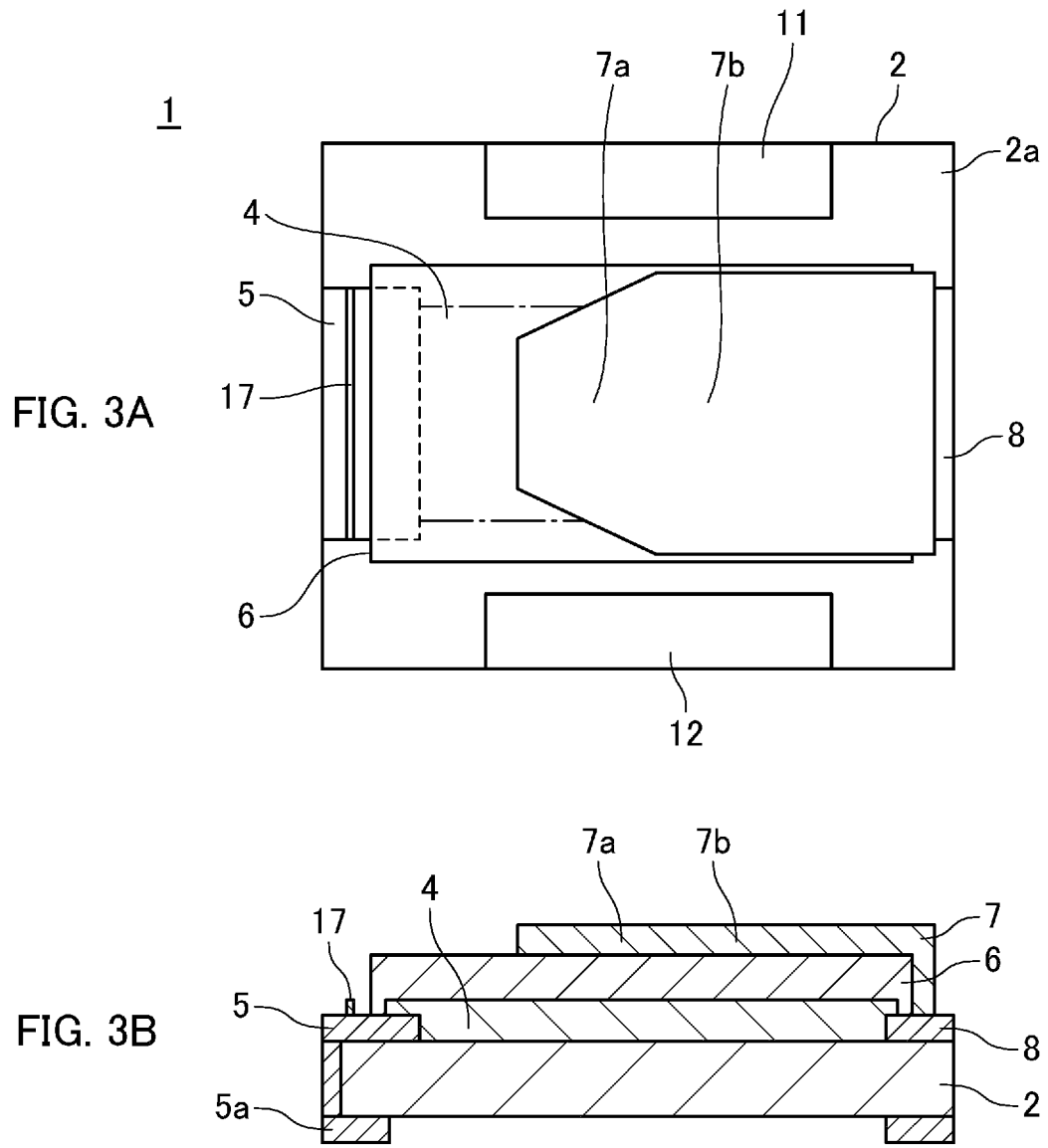

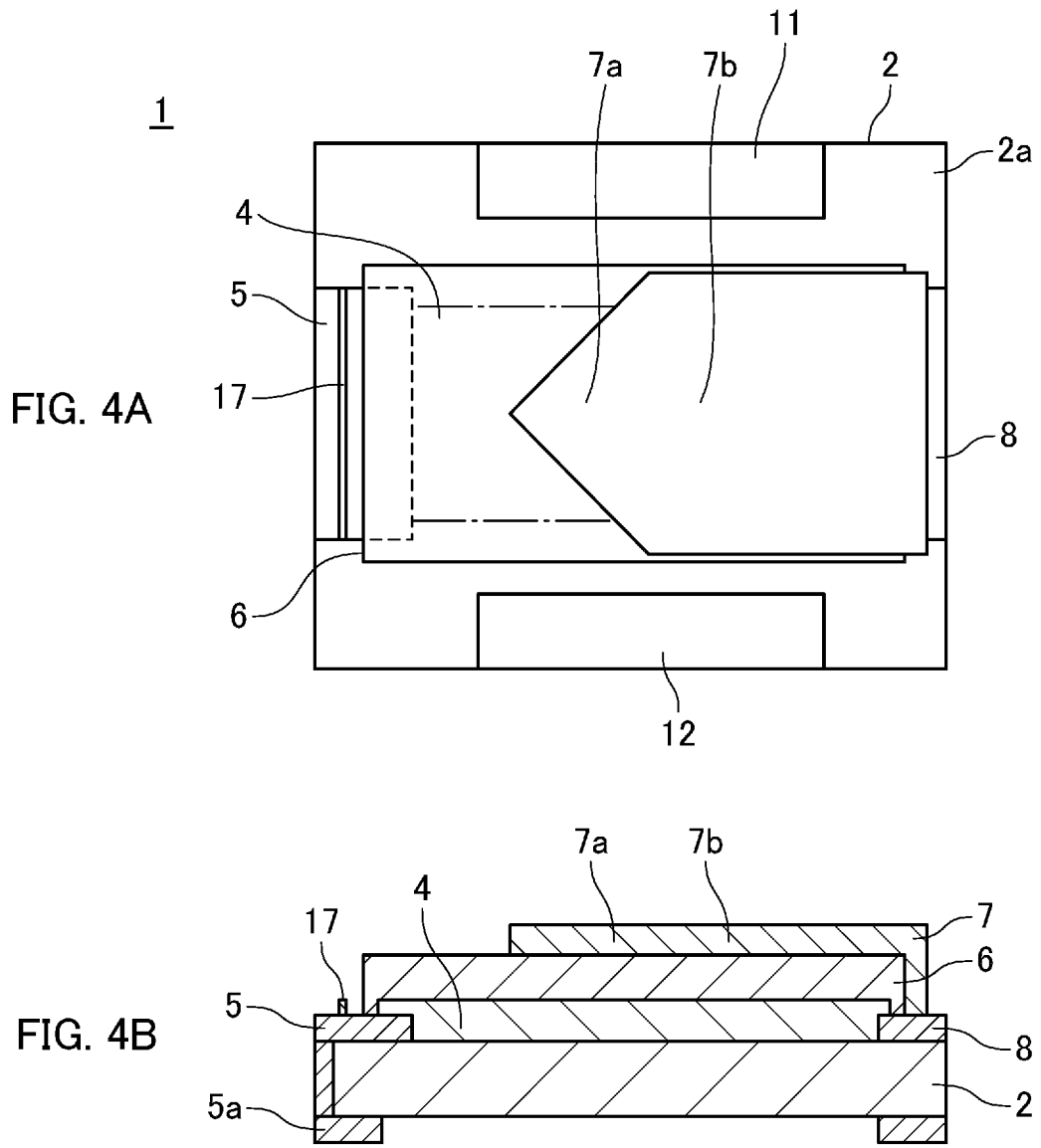

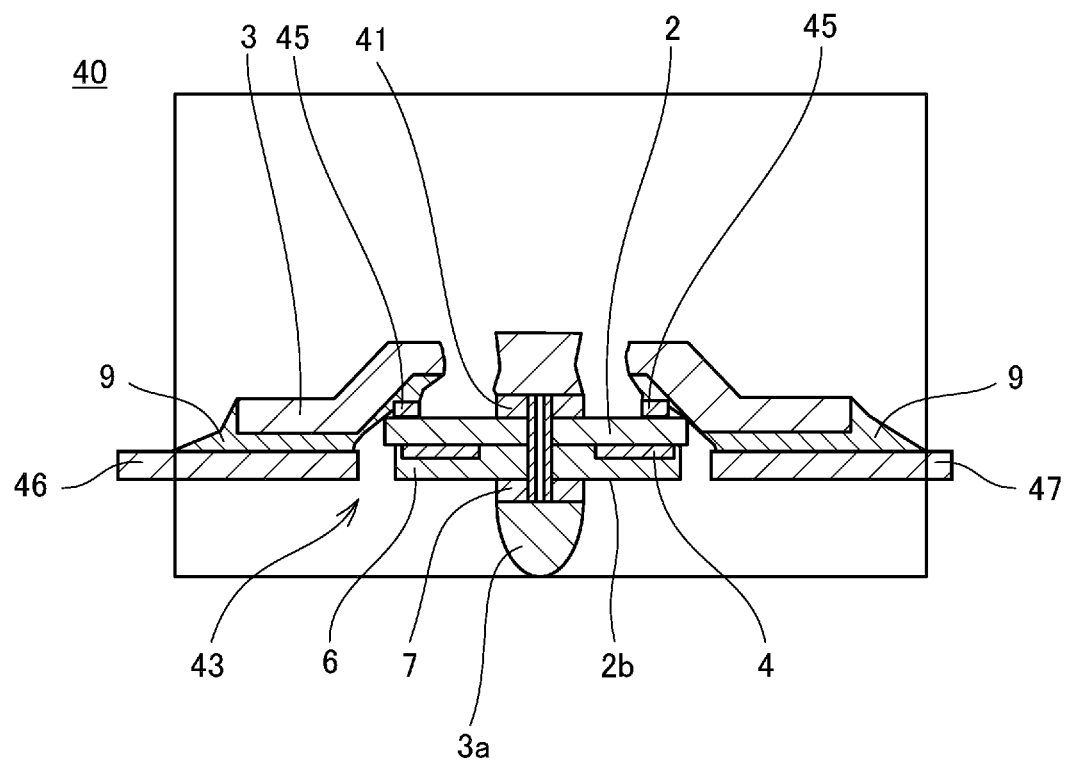
FIG. 19  A—A'
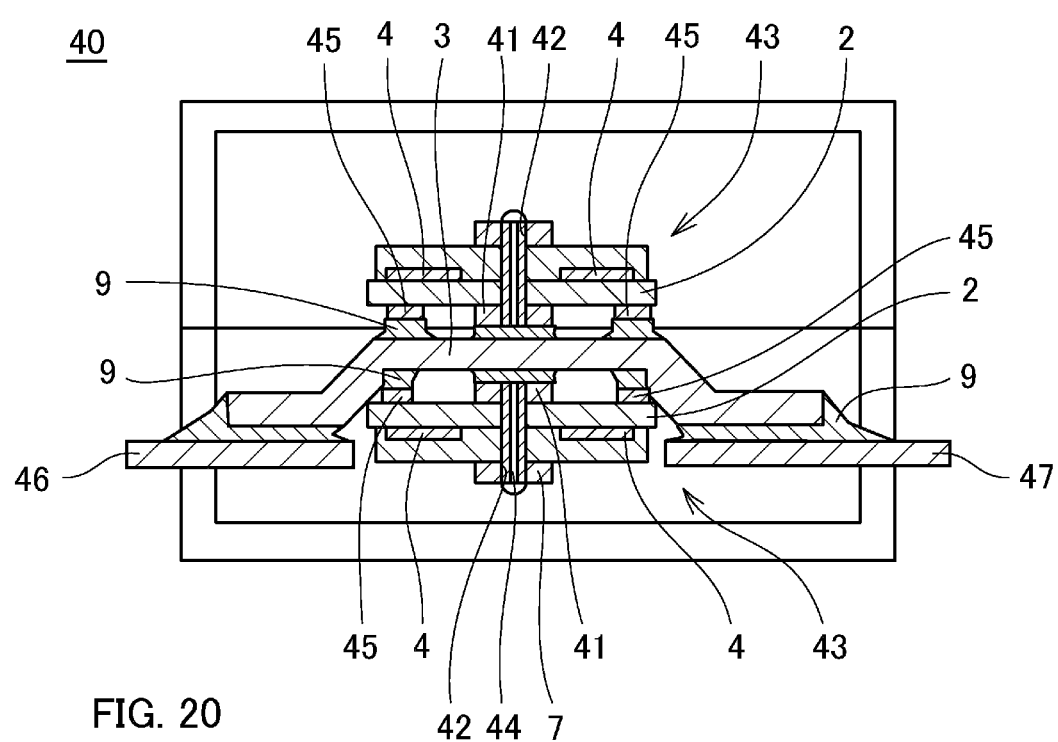
FIG. 20

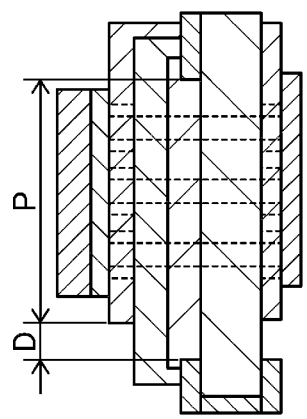
FIG. 23C
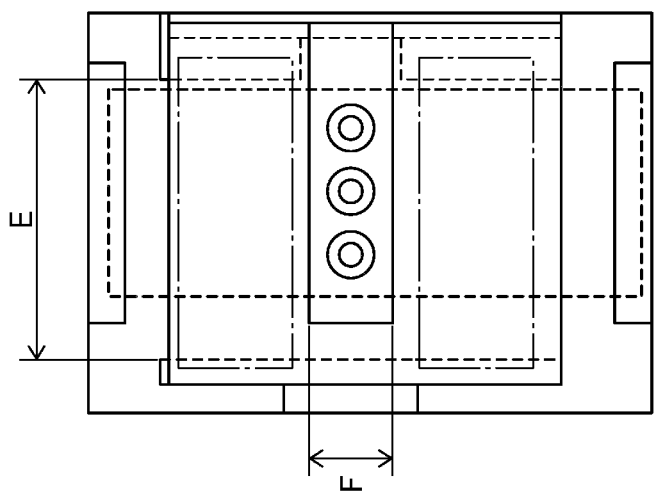
FIG. 23A
FIG. 23B

PROTECTING DEVICE AND BATTERY PACK

TECHNICAL FIELD

The present technology relates to a protecting device that protects a circuit connected to a current path by blowing out the current path, and to a battery pack using the same. This application is a National Stage Patent Application of PCT International Patent Application No. PCT/JP2020/013405, filed on Mar. 25, 2020 under 35 U.S.C. § 371, which claims priority based on Japanese Patent Application Serial No. 2019-074956, filed on Apr. 10, 2019 in Japan, the entire contents of which are incorporated herein by reference.

BACKGROUND ART

Many of the secondary batteries that can be charged and reused are provided to users in the form of battery packs. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Many of electronic devices using lithium ion secondary batteries use an FET switch incorporated in a battery pack to turn ON/OFF the output, for over-charging protection or over-discharging protection of the battery pack. However, even in the cases of the FET switch being short-circuited and damaged for some reason, a large current caused by a surge such as lighting momentarily flowing, or an abnormally decreased output voltage or an excessively high output voltage occurring in an aged battery cell, the battery pack or the electronic appliance should prevent accidents including fire, among others. For this reason, a protecting device is used having a fuse element which interrupts a current path in accordance with an external signal so as to safely interrupt the output of the battery cell under these possible abnormalities.

As a protecting device of such a protective circuit for a lithium ion secondary battery, there is used a structure in which a heat-generator is provided inside the protecting device and a meltable conductor in a current path is blown by heat generation of the heat-generator.

Applications of lithium-ion secondary batteries have expanded in recent years, and they are being considered for use in larger current applications, such as electric power tools such as electric drivers, and transportation equipment such as hybrid cars, electric vehicles, and power-assisted bicycles, and some of them have begun to be used. In these applications, particularly at startup, a large current exceeding several tens to hundred Ampere may flow. It is desired to implement a protecting device compatible to such a large current capacity.

In order to implement a protecting device compatible to such a large current, a protecting device has been proposed in which a meltable conductor having an increased cross-sectional area is used and an insulating substrate having a heat-generator formed thereon is connected to a surface of the meltable conductor.

FIGS. 25A to 25C are views illustrating a configuration example of a conventional protecting device, in which FIG. 25A is a plan view omitting the cover member, FIG. 25B is a cross-sectional view, and FIG. 25C is a bottom view. The protecting device 100 shown in FIGS. 25A to 25C includes: an insulating substrate 101; first and second electrodes 102, 103 formed on the front surface of the insulating substrate 101; a heat-generator 104 formed on the front surface of the insulating substrate 101; an insulating layer 105 covering the heat-generator 104; a heat-generator lead-out electrode 106 laminated on the insulating layer 105 and connected to the heat-generator 104; and a fuse element 107 mounted over the first electrode 102, the heat-generator lead-out electrode 106, and the second electrode 103 via connection solder.

The first and second electrodes 102, 103 are terminal portions connected in a current path of an external circuit to which the protecting device 100 is connected, and are connected via castellation to the first and second external connection electrodes 102a, 103a formed on the rear surface of the insulating substrate 101, respectively. In the protecting device 100, the first and second external connection electrodes 102a, 103a are connected to connection electrodes provided on an external circuit board on which the protecting device 100 is mounted, whereby the fuse element 107 is incorporated into a part of a current path formed on the external circuit board.

The heat-generator 104 is a conductive member having a relatively high resistance value and generating heat when energized, and is made of, for example, nichrome, W, Mo, Ru, or a material containing them. The heat-generator 104 is connected to a heat-generator feeding electrode 108 formed on the front surface of the insulating substrate 101. The heat-generator feeding electrode 108 is connected to a third external connection electrode 108a formed on the rear surface of the insulating substrate 101 through castellation. In the protecting device 100, the third external connection electrode 108a is connected to a connection electrode provided on the external circuit board on which the protecting device 100 is mounted, whereby the heat-generator 104 is connected to an external power supply provided on the external circuit. In the heat-generator 104, current and heat generation are always controlled by a switch element or the like not shown.

The heat-generator 104 is covered with an insulating layer 105 made of a glass layer or the like, and a heat-generator lead-out electrode 106 is formed on the insulating layer 105, whereby the heat-generator lead-out electrode 106 is overlapped via the insulating layer 105. Over the heat-generator lead-out electrode 106, the fuse element 107 connected between the first and second electrodes 102, 103 is connected.

Thus, in the protecting device 100, the heat-generator 104 and the fuse element 107 are thermally connected by overlapping them, and the heat-generator 104 can generate heat by energization to blow the fuse element 107.

The fuse element 107 may be formed of a low melting point metal such as a Pb-free solder or a high melting point metal such as Ag, Cu or an alloy containing these as main components, or may have a laminated structure of a low melting point metal and a high melting point metal. The fuse element 107 is connected from the first electrode 102 to the second electrode 103 across the heat-generator lead-out electrode 106 to constitute a part of the current path of the external circuit incorporating the protecting device 100. When a rate-exceeding current flows, the fuse element 107 is blown by self-heating (Joule heat) or by the heat generation of the heat-generator 104, to interrupt the current path between the first and second electrodes 102, 103.

When it is necessary to interrupt the current path of the external circuit, a switching element energize the heat-generator 104 of the protecting device 100. Thus, in the protecting device 100, the heat-generator 104 is heated to a high temperature, and the fuse element 107 incorporated in the current path of the external circuit is blown. The fuse element 107 is blown by drawing melted conductor of the fuse element 107 to the heat-generator lead-out electrode 106 and the first and second electrodes 102, 103 having high wettability. Therefore, the protecting device 100 can interrupt the path from the first electrode 102 via the heat-generator lead-out electrode 106 to the second electrode 103, thereby cutting off the current path of the external circuit.

In addition to the configuration shown in FIGS. 25A to 25C, there has been also proposed a protecting device provided with two heat-generators 104, as shown in FIGS. 26A to 26C. In the protecting device 110 shown in FIGS. 26A to 26C, two heat-generators 104 are provided in parallel between the first and second electrodes 102, 103 on the front surface of the insulating substrate 101. Each heat-generator 104 is covered with the insulating layer 105, and the heat-generator lead-out electrode 106 provided on the insulating layer 105 is formed so as to overlap and bridge the two heat-generators 104.

In the protecting device 110 shown in FIGS. 26A to 26C, a collector electrode 111 is formed on the rear surface of the insulating substrate 101, and a plurality of through-holes 112 are provided between the heat-generator lead-out electrode 106 and the collector electrode 111. The collector electrode 111 and the through-hole 112 sucks the melted conductor of the fuse element 107 melted on the heat-generator lead-out electrode 106 so as to increase the holding capacity of the melted conductor of the fuse element 107 enlarged in accordance with a large current application, and a conductive layer is formed on the inner peripheral surface of the through-hole 112.

PRIOR ART REFERENCE

Patent Reference

Patent document 1: Japanese Unexamined Patent Publication No. 2018-78046

SUMMARY OF THE INVENTION

Problem to be Solved by the Invention

In a case where the conventional configuration such as the protecting device 100 shown in FIGS. 25A to 25C and the protecting device 110 shown in FIGS. 26A to 26C is used in a protection circuit of a lithium ion secondary battery for a large current application, the lithium ion secondary battery for the large current application is used as an external power source for supplying power to the heat-generator 104, so that a high voltage is applied to the heat-generator feeding electrode 108 when the protecting device 100 works.

Therefore, in the protecting device 100, as shown in FIG. 27, a spark (discharge) may occur from the heat-generator feeding electrode 108 to the distal end of the heat-generator lead-out electrode 106, which might damage the heat-generator lead-out electrode 106. The damaged heat-generator lead-out electrode 106 may reduce the thermal conductivity to the fuse element 107 at the damaged part, extend the blow-out time of the fuse element 107, and make it difficult to interrupt the current path quickly and safely.

Also, as shown in FIG. 28, in the protecting device 110, the heat-generator lead-out electrode 106 damaged by a spark occurred from the heat-generator feeding electrode 108 to the distal end of the heat-generator lead-out electrode 106 may reduce the thermal conductivity to the fuse element 107 at the damaged portion, extend the blow-out time of the fuse element 107, and make it difficult to interrupt the current path quickly and safely. In addition, the insulating layer (glass layer) 105 is formed to have a thin thickness of 10 to 40 μm in order to efficiently transmit the heat of the heat-generator 104 to the heat-generator lead-out electrode 106 and the fuse element 107, and may be damaged by being applied heat of the heat-generator 104 for a long time. Then, as shown in FIG. 29, a spark might occur from the high potential side of the heat-generator 104 to the central portion of the heat-generator lead-out electrode 106 at the damaged portion of the insulating layer 105. When the heat-generator lead-out electrode 106 is thus damaged, the damage in the heat-generator lead-out electrode 106 in addition to the damage in the insulating layer 105 may reduce the thermal conductivity to the fuse element 107, extend the blow-out time of the fuse element 107, and make it difficult to interrupt the current path quickly and safely.

The risk that the fuse element remains unmelted due to electrode damage caused by such sparks to impede current interruption increases as the size of the fuse element increases with increasing voltage and current, as the current rating increases and the electric field strength increases, and as the distance between the heat-generator feeding electrode 108 and the heat-generator lead-out electrode 106 decreases or the thickness of the insulating layer decreases in accordance with decreasing the size of the protecting device.

Accordingly, there is a need for a protecting device incorporating a heat-generator to cope with high voltage and large current, and to take measures to operate more safely and quickly without causing electrode damage inside the device.

Accordingly, it is an object of the present technology to provide a protecting device and a battery pack using the same, which are less likely to cause a spark even when a high voltage is applied and can safely and quickly interrupt the current path.

Means of Solving the Problem

In order to solve the above problems, a protecting device according to the present technology includes: an insulating substrate; a fuse element provided at one side of the insulating substrate; a heat-generator formed on the insulating substrate to blow the fuse element by heat generation; a heat-generator feeding electrode connected to one end of the heat-generator and serving as a power-feeding terminal for the heat-generator; an insulating layer that covers the heat-generator; and a heat-generator lead-out electrode connected to the other end of the heat-generator, formed along the heat-generator on the insulating layer to hold melted conductor of the fuse element, wherein, when the heat-generator is energized via the heat-generator feeding electrode, the heat-generator feeding electrode side thereof works as a high potential portion and the heat-generator lead-out electrode side thereof works as a low potential portion, and wherein, in the heat-generator lead-out electrode, an overlapping area in which a distal end portion extending in the high potential portion side of the heat-generator overlaps the heat-generator is smaller than an overlapping area in which a proximal end portion extending in the low potential portion side of the heat-generator overlaps the heat-generator.

A battery pack according to the present technology includes: one or more battery cells; a protecting device connected to a charge/discharge path of the battery cell to interrupt the charge/discharge path; and a current control element that detects the voltage value of the battery cell and controls the energization of the protecting device, the protecting device comprising: an insulating substrate; a fuse element provided at one side of the insulating substrate; a heat-generator formed on the insulating substrate to blow the fuse element by heat generation; a heat-generator feeding electrode connected to one end of the heat-generator and serving as a power-feeding terminal for the heat-generator; an insulating layer that covers the heat-generator; and a heat-generator lead-out electrode connected to the other end of the heat-generator, formed along the heat-generator on the insulating layer to hold melted conductor of the fuse element, wherein, when the heat-generator is energized via the heat-generator feeding electrode, the heat-generator feeding electrode side thereof works as a high potential portion and the heat-generator lead-out electrode side thereof works as a low potential portion, and wherein, in the heat-generator lead-out electrode, an overlapping area in which a distal end portion extending in the high potential portion side of the heat-generator overlaps the heat-generator is smaller than an overlapping area in which a proximal end portion extending in the low potential portion side of the heat-generator overlaps the heat-generator.

Effects of the Invention

According to the present technology, although the distal end portion of the heat-generator lead-out electrode extends to the high potential portion side of the heat-generator, the overlapping area with the heat-generator is smaller than the overlapping area in which the proximal end portion overlaps the heat-generator. As a result, the distance between the distal end portion and the high potential portion of the heat-generator and the facing area (overlapping area) are reduced, so that the discharge path is less likely to be formed and the spark is less likely to occur. Therefore, even when a high voltage is applied, a spark is less likely to occur and the current path can be interrupted safely and quickly.

BRIEF DESCRIPTION OF THE DRAWINGS

FIGS. 1A to 1C are views showing a first embodiment of a protecting device according to the present technology, in which FIG. 1A is a plan view, FIG. 1B is a cross-sectional view, and FIG. 1C is a bottom view.

FIGS. 2A and 2B are views illustrating a state in which a fuse element is blown in a protecting device according to the present technology, in which FIG. 2A is a plan view and FIG. 2B is a cross-sectional view.

FIGS. 3A and 3B are views illustrating a modification example of a heat-generator lead-out electrode in a protecting device according to the present technology, in which FIG. 3A is a plan view and FIG. 3B is a cross-sectional view.

FIGS. 4A and 4B are views illustrating a modification example of a heat-generator lead-out electrode in a protecting device according to the present technology, in which FIG. 4A is a plan view and FIG. 4B is a cross-sectional view.

FIGS. 8A to 8C are views illustrating a protecting device according to a comparative example, in which FIG. 8A is a plan view, FIG. 8B is a cross-sectional view, and FIG. 8C is a bottom view.

FIGS. 10A to 10C are views illustrating a second embodiment of a protecting device according to the present technology, in which FIG. 10A is a plan view, FIG. 10B is a cross-sectional view, and FIG. 10C is a bottom view.

FIGS. 15A to 15C are views illustrating a modification of the protecting device according to the second embodiment, in which a holding electrode for holding the melted conductor of the fuse element is formed on the rear surface of the insulating substrate, in which FIG. 15A is a plan view, FIG. 15B is a cross-sectional view, and FIG. 15C is a bottom view.

FIGS. 16A and 16B are views illustrating a state in which the fuse element is blown in the protecting device shown in FIGS. 15A to 15C, in which FIG. 16A is a plan view and FIG. 16B is a cross-sectional view.

FIGS. 18A to 18C are views illustrating a third embodiment of a protecting device according to the present technology, in which FIG. 18A is a plan view, FIG. 18B is a cross-sectional view, and FIG. 18C is a bottom view.

FIG. 19 is a cross-sectional view illustrating a state in which the fuse element is blown in the protecting device according to the third embodiment.

FIG. 20 is a cross-sectional view illustrating a configuration in which a fuse element is held between a plurality of blow-out members.

FIGS. 23A to 23C are views illustrating a protecting device according to a comparative example, in which FIG. 23A is a plan view, FIG. 23B is a cross-sectional view, and FIG. 23C is a bottom view.

FIGS. 25A to 25C are view illustrating a conventional protecting device, in which FIG. 25A is a plan view, FIG. 25B is a cross-sectional view, and FIG. 25C is a bottom view.

FIGS. 26A to 26C are views illustrating a conventional protecting device, in which FIG. 26A is a plan view, FIG. 26B is a cross-sectional view, and FIG. 26C is a bottom view.

MODE FOR CARRYING OUT THE INVENTION

Figure 1C:
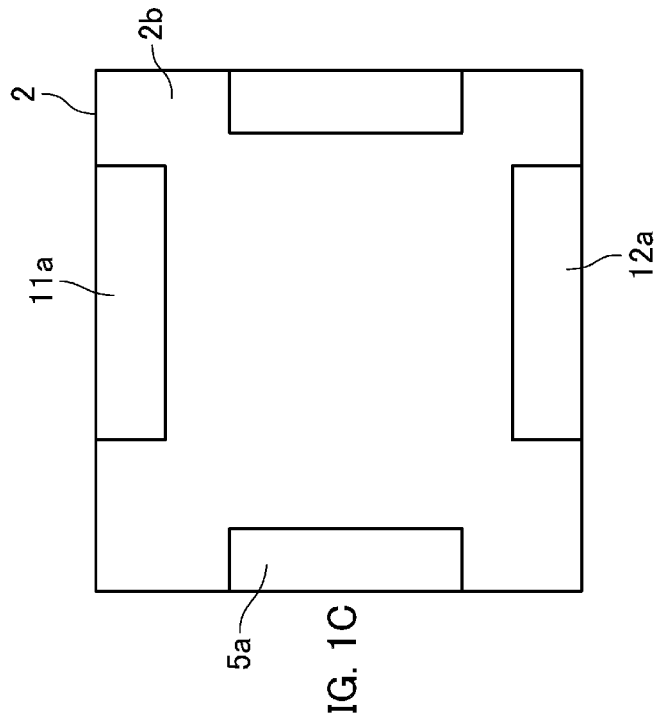

Embodiments of a protecting device and a battery pack according to the present technology will now be more particularly described with reference to the accompanying drawings. It should be noted that the present technology is not limited to the embodiments described below and various modifications can be added to the embodiment without departing from the scope of the present technology. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

First Embodiment: Heat-Generator Overlap Configuration

Figure 1A:
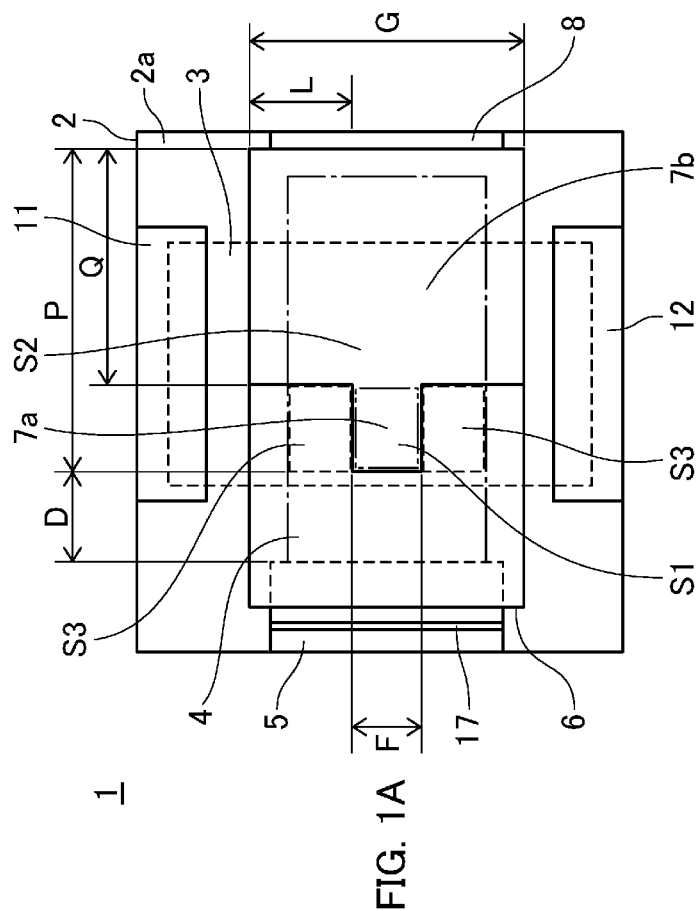
Figure 1B:
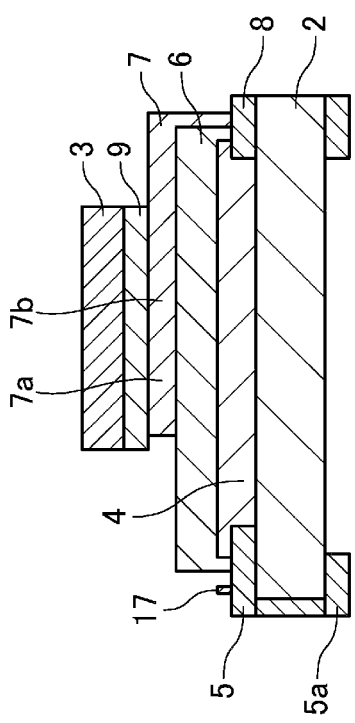

A first embodiment of a protecting device according to the present technology will be described. As shown in FIGS. 1A to 1C, a protecting device 1 according to the present technology includes: an insulating substrate 2; a fuse element 3 provided at the front surface 2a side of the insulating substrate 2; a heat-generator 4 formed on the insulating substrate 2 to blow the fuse element 3 by heat generation; a heat-generator feeding electrode 5 connected to one end of the heat-generator 4 and serving as a power-feeding terminal to the heat-generator 4; an insulating layer 6 covering the heat-generator 4; and a heat-generator lead-out electrode 7 connected to the other end of the heat-generator 4 and formed along the heat-generator 4 on the insulating layer 6 to hold melted conductor 3a of the fuse element 3.

When the heat-generator 4 is energized via the heat-generator feeding electrode 5, the heat-generator feeding electrode 5 side thereof works as a high potential portion and the heat-generator lead-out electrode 7 side thereof works as a low potential portion. The heat-generator lead-out electrode 7 is characterized in that the overlapping area in which the distal end portion 7a extending in the high potential portion side of the heat-generator 4 overlaps the heat-generator 4 is smaller than the overlapping area in which the proximal end portion 7b extending in the low potential portion side of the heat-generator 4 overlaps the heat-generator 4.

Thus, even when a high voltage is applied, the protecting device 1 is less likely to cause a spark (discharge) and can safely and quickly interrupt the current path. This may be due to the following reasons.

That is, a spark is a phenomenon in which a large current flows instantaneously between electrodes facing each other via an insulating layer due to insulation breakdown occurring from a high potential portion to a low potential portion. In the heat-generator 4 connected to an external power supply and to which a high voltage is applied, one end side connected to the heat-generator feeding electrode 5 will be at a higher potential than the other end side connected to the heat-generator lead-out electrode 7. The distal end portion 7a of the heat-generator lead-out electrode 7 extends toward the high potential portion side of the heat-generator 4, but the overlapping area thereof with the heat-generator 4 is smaller than the overlapping area of the proximal end portion 7b with the heat-generator 4. As a result, the distance between the distal end portion 7a and the high potential portion of the heat-generator 4 and the facing area (overlapping area) are reduced, so that the discharge path is less likely to be formed and the spark is less likely to occur.

In addition, the proximal end portion 7b of the heat-generator lead-out electrode 7 has a relatively large overlapping area with the heat-generator 4, but is provided at a position separated from the high potential portion of the heat-generator 4, and the other end side of the heat-generator 4 overlapping the proximal end portion 7b is a low potential portion due to voltage drop, so that a spark is less likely to occur. Therefore, a spark is also less likely to occur in the proximal end portion 7b.

This protecting device 1 is incorporated in an external circuit, whereby the fuse element 3 constitutes a part of the current path of the external circuit, and the fuse element 3 is blown by heat generation of the heat-generator 4 or an overcurrent exceeding the rating, thereby interrupting the current path. Hereinafter, each configuration of the protecting device 1 will be described in detail.

Insulating Substrate

The insulating substrate 2 is formed of an insulating member such as alumina, glass ceramics, mullite, or zirconia. Alternatively, the insulating substrate 2 may be made of a material used for a printed wiring board such as a glass epoxy substrate or a phenol substrate.

On opposite ends of the insulating substrate 2, first and second electrodes 11, 12 are formed. The first and second electrodes 11, 12 are formed of conductive patterns such as Ag and Cu, respectively. The surfaces of the first and second electrodes 11, 12 are preferably coated with a film such as Ni/Au plating, Ni/Pd plating, Ni/Pd/Au plating or the like by a known method such as plating. Thus, the protecting device 1 can prevent oxidation of the first and second electrodes 11, 12, thereby preventing changes in rating due to an increase in conduction resistance. When the protecting device 1 is reflow-mounted, the first and second electrodes 11, 12 are prevented from erosion (solder erosion) which might be caused by melting of the connection solder for connecting the fuse element 3.

The first and second electrodes 11, 12 formed on the front surface 2a of the insulating substrate 2 are connected to the first and second external connection electrodes 11a, 12a formed on the rear surface 2b through castellation. In the protecting device 1, the first and second external connection electrodes 11a, 12a formed on the rear surface 2b of the insulating substrate 2 are connected to connection electrodes provided on an external circuit board on which the protecting device 1 is mounted, whereby the fuse element 3 is incorporated into a part of a current path formed on the circuit board.

Figure 2A:
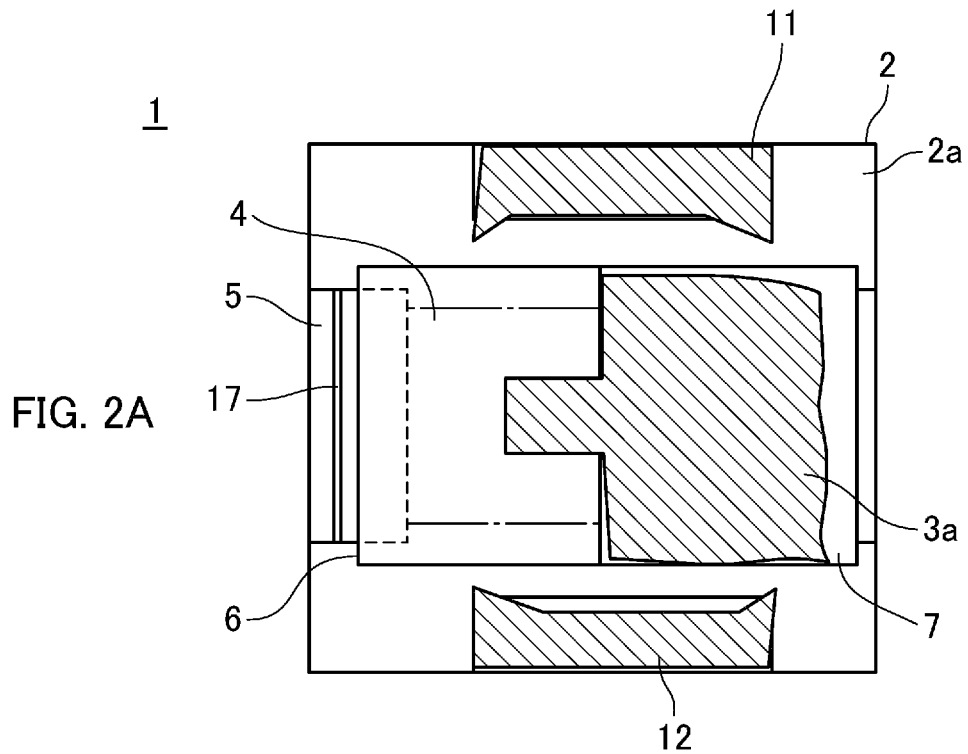
Figure 2B:
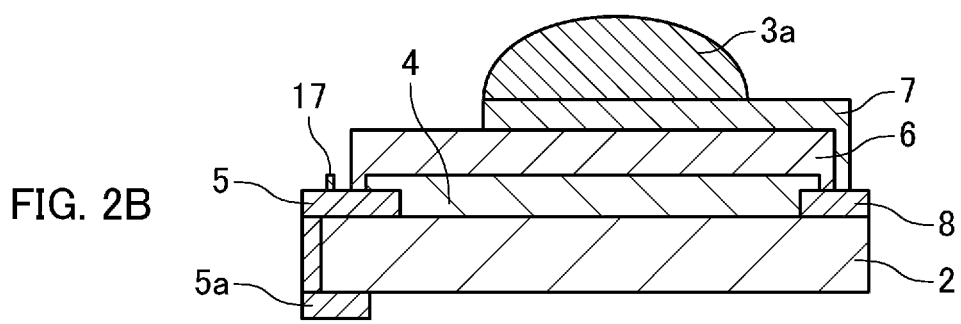

The first and second electrodes 11, 12 are electrically connected by mounting the fuse element 3 with a conductive connection material such as a connection solder 9. As shown in FIGS. 2A and 2B, the connection between the first and second electrodes 11, 12 are interrupted when a large current exceeding the rating flows through the protecting device 1 and the fuse element 3 melts due to self-heating (Joule heat), or when the heat-generator 4 generates heat by energization to blow the fuse element 3.

Heat-Generator

The heat-generator 4 is a conductive member having a relatively high resistance value to generate heat when energized, and is made of, for example, nichrome, W, Mo, Ru, or a material containing them. The heat-generator 4 can be formed by mixing the powder of these alloys, compositions, or compounds with a resin binder or the like to form a paste, forming a pattern of the paste on the insulating substrate 2 using a screen printing technique, and baking the paste.

One end of the heat-generator 4 is connected to the heat-generator feeding electrode 5, and the other end thereof is connected to a heat-generator electrode 8. The heat-generator feeding electrode 5 and the heat-generator electrode 8 are respectively formed on opposite side edges of the insulating substrate 2 different from the side edges provided with the first and second electrodes 11, 12. The heat-generator feeding electrode 5 is an electrode connected to one end of the heat-generator 4 and serves as a power-feeding terminal for the heat-generator 4, and is connected with a third external connection electrode 5a formed on the rear surface 2b of the insulating substrate 2 via castellation. The heat-generator electrode 8 is connected to the heat-generator lead-out electrode 7.

The heat-generator 4 is covered with the insulating layer 6 and overlaps the heat-generator lead-out electrode 7 formed on the insulating layer 6. The heat-generator lead-out electrode 7 is connected, through a bonding material such as a connection solder 9, to the fuse element 3 provided between the first and second electrodes 11, 12.

The insulating layer 6 is provided to protect and insulate the heat-generator 4 and to efficiently transmit the heat of the heat-generator 4 to the heat-generator lead-out electrode 7 and the fuse element 3, and is made of, for example, a glass layer. The insulating layer 6 is formed to have a thin thickness of, for example, 10 to 40 μm in order to efficiently transmit the heat of the heat-generator 4 to the heat-generator lead-out electrode 7 and the fuse element 3.

By mounting the protecting device 1 onto an external circuit board, the heat-generator 4 is connected to a current control element or the like formed in the external circuit via the third external connection electrode 5a and current and heat generation thereof are restricted under normal conditions. Then, the heat-generator 4 is energized via the third external connection electrode 5a at a predetermined timing for interrupting the current path of the external circuit to generate heat. At this time, in the heat-generator 4, the heat-generator feeding electrode 5 side thereof works as a high potential portion and the heat-generator lead-out electrode 7 side thereof works as a low potential portion. The protecting device 1 can melt the fuse element 3 connecting the first and second electrodes 11, 12 by transmitting heat of the heat-generator 4 to the fuse element 3 through the insulating layer 6 and the heat-generator lead-out electrode 7. The melted conductor 3a of the fuse element 3 is aggregated on the heat-generator lead-out electrode 7 and the first and second electrodes 11, 12, thereby interrupting the current path between the first and second electrodes 11, 12. In addition, the heat-generator 4 stops heat generation when the fuse element 3 is blown to interrupt its own conduction path.

The heat-generator feeding electrode 5 is preferably provided with a regulating wall 17 for preventing the connection solder provided in the electrode of the external circuit board connected to the third external connection electrode 5a and melted in reflow mounting or the like from crawling up to the heat-generator feeding electrode 5 through castellation and wetting and spreading on the heat-generator feeding electrode 5. The regulating wall 17 can be made of, for example, an insulating material such as glass, solder resist, or insulating adhesive having no wettability to solder, and can be formed on the heat-generator feeding electrode 5 by printing or the like. Providing the regulating wall 17 can prevent the melted connection solder from wetting and spreading to the heat-generator feeding electrode 5, thereby maintaining the connectivity between the protecting device 1 and the external circuit board.

Heat-Generator Lead-Out Electrode

The heat-generator lead-out electrode 7 is formed of a conductive pattern such as Ag or Cu as with the first and second electrodes 11, 12. The surface of the heat-generator lead-out electrode 7 is preferably coated with a film such as Ni/Au plating, Ni/Pd plating, Ni/Pd/Au plating or the like by a known method such as plating or the like.

The heat-generator lead-out electrode 7 is connected at one end to the heat-generator electrode 8, is formed on the insulating layer 6, and overlaps the heat-generator 4 via the insulating layer 6. As described above, the heat-generator lead-out electrode 7 has the distal end portion 7a extending in the high potential portion side of the heat-generator 4 and the proximal end portion 7b extending in the low potential portion side at the time of energization, and the overlapping area S1 in which the distal end portion 7a overlaps the heat-generator 4 is smaller than the overlapping area S2 in which the proximal end portion 7b overlaps the heat-generator 4. Thus, even when a high voltage is applied from an external circuit, the protecting device 1 is less likely to cause a spark (discharge) and can safely and quickly interrupt the current path.

Here, in the protecting device 1, when a direction perpendicular to the conduction direction of the heat-generator 4 is defined as a direction of width, the heat-generator lead-out electrode 7 has a wide width portion provided at the low potential portion side and a narrow width portion provided at the high potential portion side and protruding from the wide width portion wherein the wide width portion is the proximal end portion 7b and the narrow width portion protruding from the proximal end portion 7b is the distal end portion 7a. Further, in the heat-generator lead-out electrode 7, the overlapping area S1 in which the distal end portion 7a overlaps the heat-generator 4 is smaller than the overlapping area S2 in which the proximal end portion 7b overlaps the heat-generator 4.

Thus, even when the entire distal end portion 7a overlaps the heat-generator 4 as shown in FIGS. 1A to 1C, the protecting device 1 is less likely to cause a spark (discharge) when a high voltage is applied from an external circuit, and can safely and quickly interrupt the current path.

Further, by providing the wide proximal end portion 7b to the heat-generator lead-out electrode 7, the capacity for holding the melted conductor 3a of the fuse element 3 can be increased, thereby surely blow the fuse element 3. That is, although the heat-generator lead-out electrode 7 can prevent sparks by providing a narrow distal end portion 7a, at the same time, the reduced area of the heat-generator lead-out electrode 7 will decrease the capacity for holding the melted conductor 3a when the fuse element 3 is melted, and the melted conductor 3a overflowing from the heat-generator lead-out electrode 7 may come into contact with the melted conductor 3a on the first and second electrodes 11, 12, so that the conduction path might not be interrupted. In this regard, the heat-generator lead-out electrode 7 can increase the capacity to hold the melted conductor 3a by forming the wide proximal end portion 7b, thereby surely blow the fuse element 3 (FIGS. 2A and 2B).

In addition, as shown in FIGS. 1A to 1C, in the protecting device 1, in an assumed region in which the distal end portion 7a of the heat-generator lead-out electrode 7 is assumed to have a width equal to that of the proximal end portion 7b, the overlapping area S1 that overlaps the heat-generator 4 is preferably narrower than the non-overlapping area S3 that does not overlap the heat-generator in the assumed region. In the protecting device 1 shown in FIGS. 1A to 1C, the non-overlapping area S3 in the assumed region refers to the total area of both sides of the distal end portion 7a.

In the distal end portion 7a, by making the overlapping area S1 of the heat-generator 4 that overlaps the high potential portion smaller than the non-overlapping area S3 that does not overlap the high potential portion in the assumed region, the discharge path is less likely to be formed and the spark is less likely to occur.

As shown in FIGS. 1A to 1C, it is preferable that the area of the distal end portion 7a of the heat-generator lead-out electrode 7 is smaller than the area of the proximal end portion 7b. Thus, even when the entire distal end portion 7a overlaps the heat-generator 4, the protecting device 1 is less likely to cause a spark (discharge) when a high voltage is applied from an external circuit, and can safely and quickly interrupt the current path.

FIGS. 3A, 3B, 4A and 4B illustrate modifications of the heat-generator lead-out electrode 7. The distal end portion 7a of the heat-generator lead-out electrode 7 may be formed into a substantially trapezoidal shape or a triangular shape. In FIGS. 3A, 3B, 4A and 4B, the fuse element 3 is omitted.

Further, as shown in FIGS. 1A to 1C, the fuse element 3 is mounted on the heat-generator lead-out electrode 7, and the distal end portion 7a of the heat-generator lead-out electrode 7 preferably does not protrude from the side edge of the fuse element 3 toward the heat-generator feeding electrode 5. Since the heat-generator feeding electrode 5 is applied with a high voltage to have a high potential, by retreating the heat-generator lead-out electrode 7 from the fuse element 3 to the low potential portion side, the heat-generator lead-out electrode 7 can be separated from the high potential portion. If the distal end portion 7a of the heat-generator lead-out electrode 7 protrudes toward the heat-generator feeding electrode 5 side from the side edge of the fuse element 3, the distal end portion 7a might act as a lightning rod; this configuration, however, does not form such a lightning rod portion, thereby reducing the risk of occurrence of spark. Furthermore, the overlapping of the heat-generator lead-out electrode 7 and the fuse element 3 increases the volume of the metal (that is, the distal end portion 7a and the fuse element 3) facing the heat-generator feeding electrode 5 having a high potential, thereby improving resistance to impact and preventing breakage even when a spark occurs.

Fuse Element

Next, the fuse element 3 will be described. The fuse element 3 is mounted between the first and second electrodes 11, 12, and blown due to heat generation by the energization of the heat-generator 4 or due to self-heat generation (Joule heat) by a current exceeding a rating flowing therethrough, to interrupt a current path between the first electrode 11 and the second electrode 12.

The fuse element 3 may be a conductive material which melts due to heat generation by energization of the heat-generator 4 or an overcurrent state, and for example, may be made of SnAgCu-based Pb-free solder as well as BiPbSn alloy, BiPb alloy, BiSn alloy, SnPb alloy, PbIn alloy, ZnAl alloy, InSn alloy, PbAgSn alloy or the like.

Figure 5:
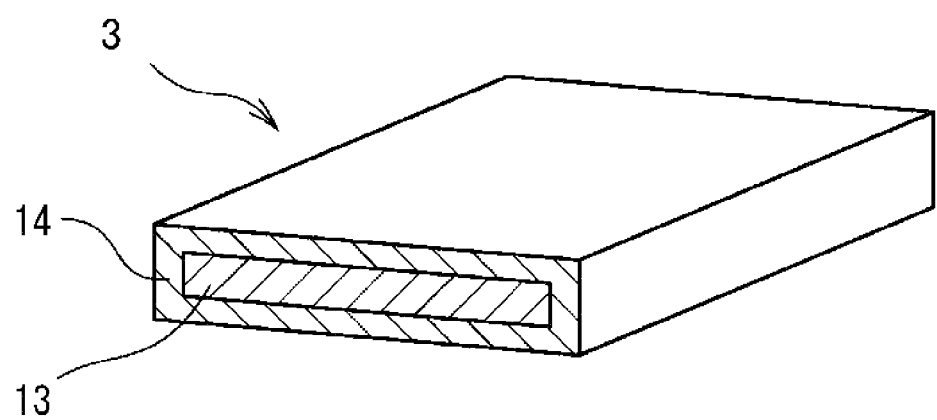
FIG. 5 is an external perspective view of a fuse element.

The fuse element 3 may have a structure having a high melting point metal and a low melting point metal. For example, as shown in FIG. 5, the fuse element 3 may have a laminated structure consisting of an inner layer and an outer layer, and may include a low melting point metal layer 13 as the inner layer and a high melting point metal layer 14 as the outer layer laminated on the low melting point metal layer 13. The fuse element 3 is connected to the first and second electrodes 11, 12 and the heat-generator lead-out electrode 7 through a bonding material such as a connection solder 9.

The low melting point metal layer 13 is preferably a solder or a Sn-based metal and is generally referred to as "Pb-free solder". The low melting point metal layer 13 may have a melting point lower than the temperature of the reflow furnace and may be melted at about 200° C. The high melting point metal layer 14 is a metal layer laminated on the surface of the low melting point metal layer 13, made of, for example, Ag or Cu, or a metal containing any of these as a main component, and has a high melting point so as not to melt at the time of reflow process performed to connect first and second electrodes 11, 12 and the heat-generator lead-out electrode 7 to the fuse element 3 or to mount the protecting device 1 on the external circuit board.

This fuse element 3 can be formed by forming a high melting point metal layer on a low melting point metal foil using a plating technique, or can be formed by using other well-known lamination techniques or film-forming techniques. In this case, the fuse element 3 may have a structure in which the entire surface of the low melting point metal layer 13 is covered with the high melting point metal layer 14, or may have a structure in which the fuse element 3 is covered except for a pair of opposing side surfaces. The fuse element 3 may be formed in various configurations, such as a structure having a high melting point metal layer 14 as an inner layer and a low melting point metal layer 13 as an outer layer, a multi-layer structure having three or more layers in which low melting point metal layers and high melting point metal layers are alternately laminated, or a structure in which a part of the inner layer is exposed by providing an opening in a part of the outer layer.

By laminating the high melting point metal layer 14 as an outer layer on the low melting point metal layer 13 as an inner layer, the fuse element 3 can maintain the shape as the fuse element 3 even when the reflow temperature exceeds the melting temperature of the low melting point metal layer 13, and will not be blown. Therefore, the connection of the first and second electrodes 11, 12 and the heat-generator lead-out electrode 7 to the fuse element 3 and the mounting of the protecting device 1 onto the external circuit board can be efficiently performed by reflow process, and it is possible to prevent changes in blowout properties, which might otherwise cause a problem in which the fuse element 3 might be deformed to locally increase or decrease the resistance value so that it cannot be blown at a predetermined temperature or will be blown below a predetermined temperature.

Further, the fuse element 3 does not melt by self-heating while a predetermined rated current flows. When a current exceeding the rated value flows, the fuse element 3 melts due to self-heating and interrupts the current path between the first and second electrodes 11, 12. Further, when the heat-generator 4 is energized and generates heat, which blows the fuse element 3 to interrupt the current path between the first and second electrodes 11, 12.

In this case, in the fuse element 3, the melted low melting point metal layer 13 erodes the high melting point metal layer 14 (solder erosion), whereby the high melting point metal layer 14 melts at a temperature lower than the melting temperature thereof. Thus, the fuse element 3 can be blown in a short time by utilizing the erosive action on the high melting point metal layer 14 by the low melting point metal layer 13. Further, since the melted conductor 3a of the fuse element 3 is separated by the physical drawing action of the heat-generator lead-out electrode 7 and the first and second electrodes 11, 12, the current path between the first and second electrodes 11, 12 can be quickly and reliably interrupted (FIGS. 2A and 2B).

In the fuse element 3, the volume of the low melting point metal layer 13 is preferably larger than that of the high melting point metal layer 14. The fuse element 3 is heated by self-heating by an overcurrent or heat generated by the heat-generator 4, and the low melting point melts and erodes the high melting point metal, so that the fuse element 3 can melt and interrupt the path quickly. Therefore, by forming the volume of the low melting point metal layer 13 larger than the volume of the high melting point metal layer 14, the fuse element 3 can promotes the erosive action and can quickly interrupt the path between the first and second external connection electrodes 11, 12.

Further, since the fuse element 3 is constituted by laminating the high melting point metal layer 14 on the low melting point metal layer 13 serving as an inner layer, the fusing temperature can be significantly decreased as compared with conventional chip fuses or the like made of a high melting point metal. Therefore, the fuse element 3 can be formed to have a larger cross-sectional area than a chip fuse or the like of the same size, and can greatly improve the current rating. Further, the fuse element 3 can be made smaller and thinner than a conventional chip fuse having the same current rating, and is excellent in rapid blowout property.

In addition, the fuse element 3 can improve tolerance to a surge (pulse tolerance) which would occur when an abnormally high voltage is momentarily applied to the electric system incorporating the protecting device 1. For example, the fuse element 3 should not be blown in the case of a current of 100 A flowing for a few milliseconds. In this regard, since the large current flowing in an extremely short time flows through the surface layer of the conductor (skin effect), and the fuse element 3 is provided with the high melting point metal layer 14 such as Ag plating having a low resistance value as an outer layer, a current caused by a surge can easily allowed to flow, thereby preventing blowout due to self-heating. Therefore, the fuse element 3 can significantly improve serge tolerance as compared with conventional fuses made of solder alloys.

The fuse element 3 may be coated with a flux (not shown) for preventing oxidation and improving wettability at the time of blowout. In the protecting device 1, the insulating substrate 3 is covered with a case member (not shown) to protect the inside thereof. The case member can be formed by using an insulating member such as various engineering plastics, thermoplastic plastics, ceramics, and glass epoxy substrates, among others. Further, the case has a sufficient internal space on the front surface 2a of the insulating substrate 2 for the fuse element 3 to expand spherically when melted, and for the melted conductor 3a to aggregate on the heat-generator lead-out electrode 7 and the first and second electrodes 11, 12.

Circuit Configuration Example

Figure 6:
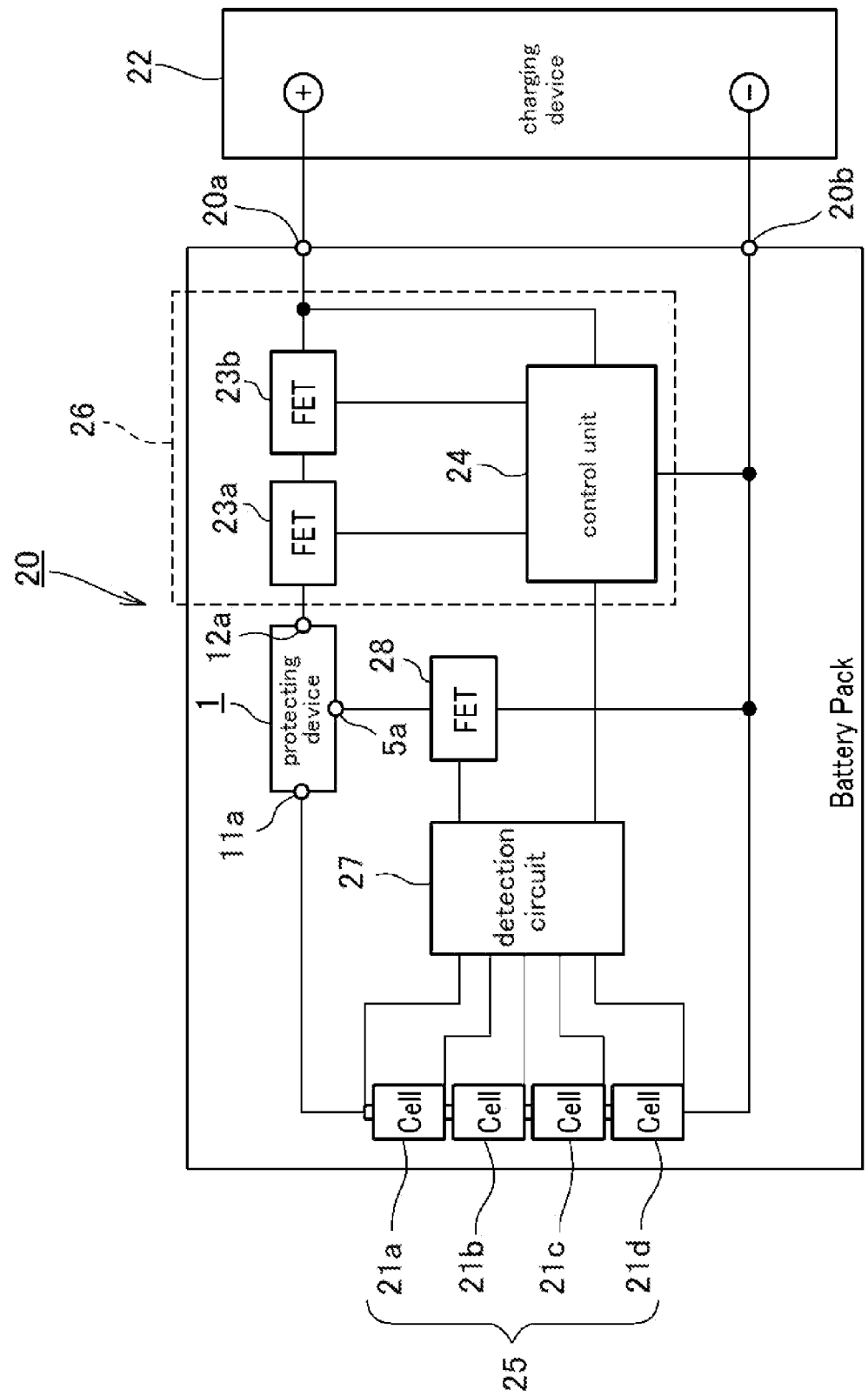
FIG. 6 is a circuit diagram illustrating a configuration example of a battery pack.

As shown in FIG. 6, such a protecting device 1 is used, for example, in a circuit in a battery pack 20 of a lithium ion secondary battery. The battery pack 20 includes a battery stack 25 comprising, for example, a total of four battery cells 21a to 21d of the lithium ion secondary batteries.

The battery pack 20 includes: the battery stack 25; a charge/discharge control circuit 26 for controlling charge/discharge of the battery stack 25; the protecting device 1 according to the present technology for interrupting a charge/discharge path when the state of the battery stack 25 is abnormal; a detection circuit 27 for detecting the voltages of each of the battery cells 21a to 21d; and a current control element 28 serving as a switch element for controlling the operation of the protecting device 1 according to the detection result of the detection circuit 27.

In the battery stack 25, the battery cells 21a to 21d requiring control for protection from over-charging and over-discharging states are connected in series, and are detachably connected to the charging device 22 via a positive electrode terminal 20a and a negative electrode terminal 20b of the battery pack 20, so as to apply charging voltage from the charging device 22. By connecting the positive electrode terminal 20a and the negative electrode terminal 20b to a battery-driven electronic device, the battery pack 20 charged by the charging device 22 can drive the electronic device.

The charge/discharge control circuit 26 includes two current control elements 23a, 23b connected in series in the current path between the battery stack 25 and the charging device 22, and a control unit 24 for controlling operations of the current control elements 23a, 23b. The current control elements 23a, 23b are formed of, for example, a field effect transistors (hereinafter referred to as FETs) and the control unit 24 controls the gate voltage to switch the current path of the battery stack 25 between a conducting state and an interrupted state in the charging and/or discharging direction. The control unit 24 is powered by the charging device 22 and controls the operation of the current control elements 23a, 23b in accordance with the a detection result by the detection circuit 27 to interrupt the current path when over-discharging or over-charging occurs in the battery stack 25.

The protecting device 1 is connected in a charge/discharge current path between the battery stack 25 and the charge/discharge control circuit 26, for example, and the operation thereof is controlled by the current control element 28.

The detection circuit 27 is connected to each of the battery cells 21a to 21d so as to detect the voltage values of each of the battery cells 21a to 21d and supplies each of the voltage values to the control unit 24 of the charge/discharge control circuit 26. Furthermore, when an over-charging voltage or an over-discharging voltage is detected in any one of the battery cells 21a to 21d, the detection circuit 27 outputs a control signal for controlling the current control element 28.

When the detection signal output from the detection circuit 27 indicates a voltage exceeding a predetermined threshold value corresponding to over-discharging or over-charging state of the battery cells 21a to 21d, the current control element 28 such as an FET, for example, activates the protecting device 1 to interrupt the charging/discharging current path of the battery stack 25 without the switching operation of the current control elements 23a, 23b.

Figure 7:
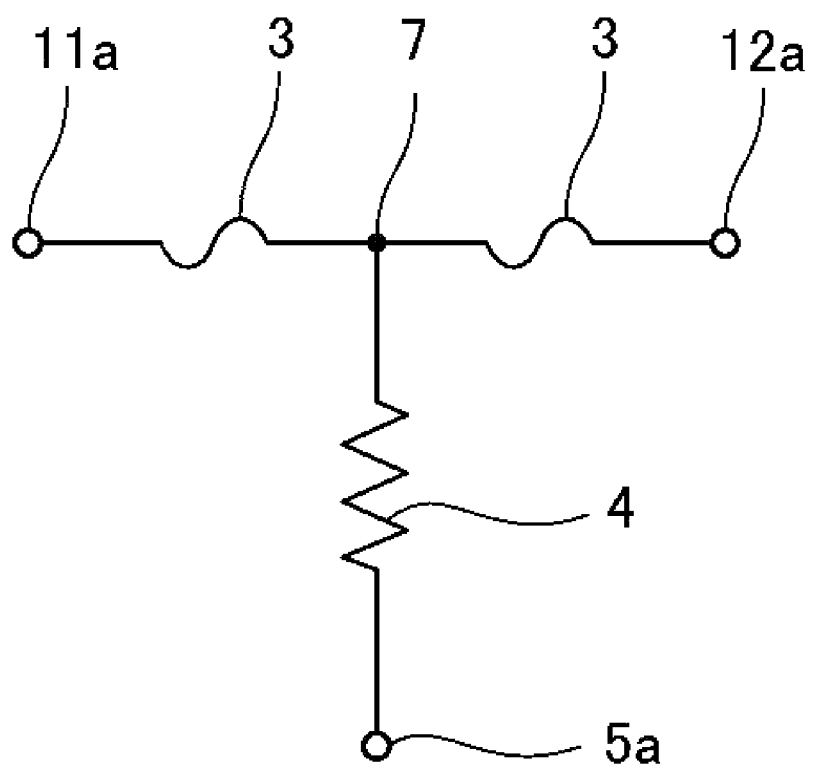
FIG. 7 is a circuit diagram of a protecting device according to a first embodiment.

The protecting device 1 according to the present technology, which is used in the battery pack 20 having the above-described configuration, has a circuit configuration as shown in FIG. 7. That is, in the protecting device 1, the first external connection electrode 11a is connected to the battery stack 25 side, and the second external connection electrode 12a is connected to the positive electrode terminal 20a side, whereby the fuse element 3 is connected in series in the charge/discharge path of the battery stack 25. Furthermore, in the protecting device 1, the heat-generator 4 is connected to the current control element 28 via the heat-generator feeding electrode 5 and the third external connection electrode 5a, and the heat-generator 4 is also connected to the open end of the battery stack 25. As a result, one end of the heat-generator 4 is connected to the fuse element 3 and one open end of the battery stack 25 via the heat-generator lead-out electrode 7, and the other end thereof is connected to the current control element 28 and the other open end of the battery stack 25 via the third external connection electrode 5a, thereby forming a power supply path to the heat-generator 4 the conduction of which is controlled by the current control element 28.

Operation of Protecting Device

Upon detecting an abnormal voltage in any of the battery cells 21a to 21d, the detection circuit 27 outputs an interruption signal to the current control element 28. Then, the current control element 28 controls the current so as to energize the heat-generator 4. In the protecting device 1, a current flows from the battery stack 25 to the heat-generator 4, and the heat-generator 4 starts heating. In the protecting device 1, the fuse element 3 is melted by the heat generation of the heat-generator 4 to interrupt the charge/discharge path of the battery stack 25. In the protecting device 1, by forming the fuse element 3 with a high melting point metal and a low melting point metal, the low melting point metal is melted before the melting of the high melting point metal, and the fuse element 3 can be blown in a short time by utilizing the erosive action on the high melting point metal by the melted low melting point metal.

In the protecting device 1, the overlapping area S1 in which the distal end portion 7a extending in the high potential portion side, which has a high potential at the time of energization, of the heat-generator 4 overlaps the heat-generator 4 is smaller than the overlapping area S2 in which the proximal end portion 7b extending in the low potential portion side overlaps the heat-generator 4. Thus, even when a high voltage is applied to the heat-generator feeding electrode 5 from the battery stack 25 corresponding to a large current application, the protecting device 1 is less likely to cause a spark (discharge) and can safely and quickly interrupt the current path.

Further, since the protecting device 1 has the distal end portion 7a protruding from the proximal end portion 7b of the heat-generator lead-out electrode 7 and having a narrow width, heat of the heat-generator 4 is concentrated on the distal end portion 7a, and high heat can be quickly transmitted from the distal end portion 7a to the fuse element 3. That is, since the protecting device 1 has the distal end portion 7a having a narrow width, the heat of the heat-generator 4 is concentrated at the distal end portion 7a without diffusing as compared with the rectangular heat-generator lead-out electrode and can be efficiently transmitted to the fuse element 3. Therefore, even when the cross-sectional area of the fuse element 3 is increased to cope with a large current application, the protecting device 1 can concentrate heat on the distal end portion 7a to quickly blow the fuse element 3.

In the protecting device 1, by blowing the fuse element 3, the power supply path to the heat-generator 4 is also interrupted, thereby stopping the heating of the heat-generator 4.

In addition, even when an overcurrent exceeding the rating is applied to the battery pack 20, the protecting device 1 can blow the fuse element 3 by self-heating and interrupt the charge/discharge path of the battery pack 20.

As described above, in the protecting device 1, the fuse element 3 is blown by heat generated in the energized heat-generator 4 or by self-heat generation of the fuse element 3 at the time of overcurrent. In this regard, since the fuse element 3 has a structure in which a low melting point metal is covered with a high melting point metal, the protecting device 1 can suppress deformation of the fuse element 3 even when the protecting device 1 is mounted on a circuit board by reflow mounting or the circuit board on which the protecting device 1 is mounted is exposed to a high-temperature environment such as reflow heating. Therefore, it is possible to prevent changes in blowout properties caused by changes in resistance values or the like due to deformation of the fuse element 3, and to blow the fuse element 3 by the predetermined overcurrent or the heat generation of the heat-generator 4.

The protecting device 1 according to the present technology is not limited to the cases where it is used for a battery pack of a lithium ion secondary battery, and is of course applicable to various applications requiring interruption of a current path by an electric signal.

First Example

Next, a first example of the protecting device 1 will be described. In the first example, the protecting device 1 shown in FIGS. 1A to 1C and a protecting device provided with a rectangular heat-generator lead-out electrode shown in FIGS. 25A to 25C and FIGS. 8A to 8C were prepared, and the presence or absence of a spark was determined by applying voltages of 50V, 100V, and 200V, respectively. The blowout time of the fuse element was measured and the cases in which the fuse element was blown within a predetermined time (60 seconds) were evaluated as "G" (good), and the cases in which the fuse element was not blown within a predetermined time were evaluated as "B" (bad).

The dimensions of each part of the protecting device according to Examples and Comparative examples are defined as follows. The numerical values of the respective parts shown in Table 1 are numerical values indicating the ratio when E is regarded as 1.

D: distance between the distal end portion of the heat-generator lead-out electrode and the heat-generator feeding electrode E: length of the heat-generator in the energizing direction F: minimum width of the heat-generator lead-out electrode G: maximum width of the heat-generator lead-out electrode L: width between the side edge of the distal end portion and the side edge of the proximal end portion of the heat-generator lead-out electrode P: overlapping length by which the heat-generator lead-out electrode overlaps the heat-generator Q: length of the proximal end portion of the heat-generator lead-out electrode

TABLE 1

|   | Ex. 1 | Comp. 1 | Comp. 2 |
|---|---|---|---|
| D | 0.38 | 0.07 | 0.38 |
| E | 1.00 | 1.00 | 1.00 |
| F | 0.10 | 0.21 | 0.21 |
| G | 0.33 | 0.21 | 0.21 |
| L | 0.06 | 0.00 | 0.00 |
| P | 0.62 | 0.93 | 0.62 |
| Q | 0.48 | 0.00 | 0.00 |

Example 1

The protecting device shown in FIGS. 1A to 1C was used in Example 1. In the protecting device according to Example 1, a proximal end portion (width G: 0.33) and a distal end portion (width F: 0.1) are provided in the heat-generator lead-out electrode, and the proximal end portion is formed 0.06 wider than the distal end portion at one side. The heat-generator lead-out electrode does not protrude from the fuse element toward the heat-generator feeding electrode side, the distance D between the distal end portion of the heat-generator lead-out electrode and the heat-generator feeding electrode is secured to be 0.38, and the overlapping length P by which the heat-generator lead-out electrode overlaps the heat-generator is 0.62.

Comparative Example 1

Figure 25A:
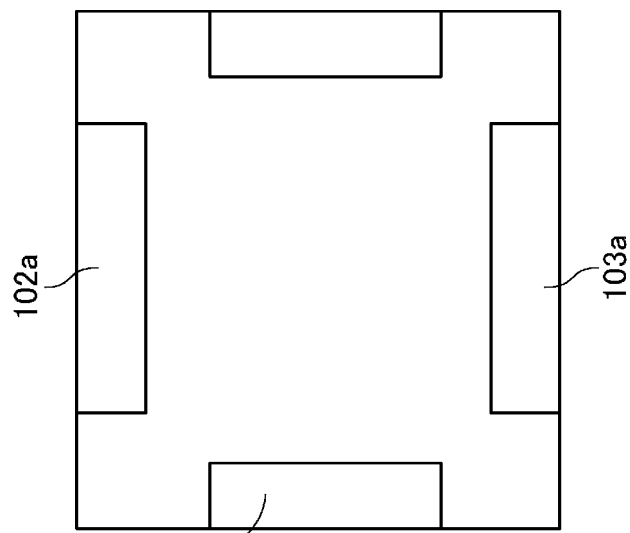
Figure 25B:
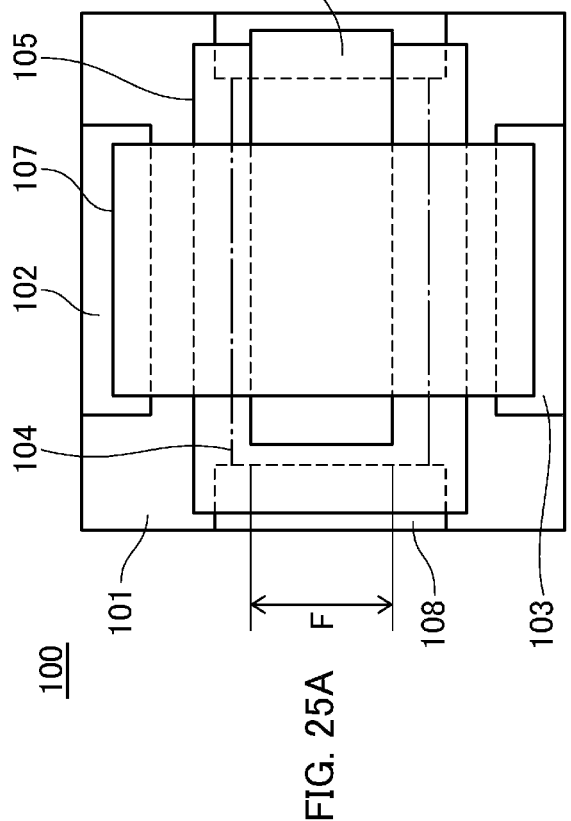
Figure 25C:
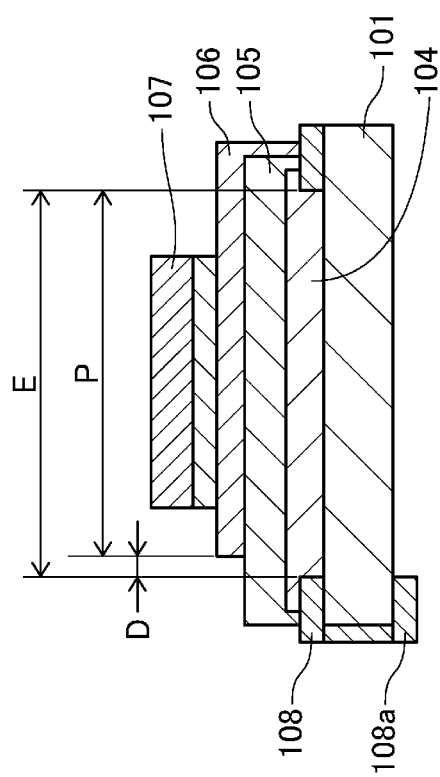

The protecting device shown in FIGS. 25A to 25C was used in Comparative Example 1. In the protecting device according to Comparative Example 1, a rectangular heat-generator lead-out electrode (width: 0.21) is formed. The heat-generator lead-out electrode protrudes from the fuse element toward the heat-generator feeding electrode side, the distance D between the distal end portion of the heat-generator lead-out electrode and the heat-generator feeding electrode is as short as 0.07, and the overlapping length P by which the heat-generator lead-out electrode overlaps the heat-generator is 0.93.

Comparative Example 2

Figure 8C:
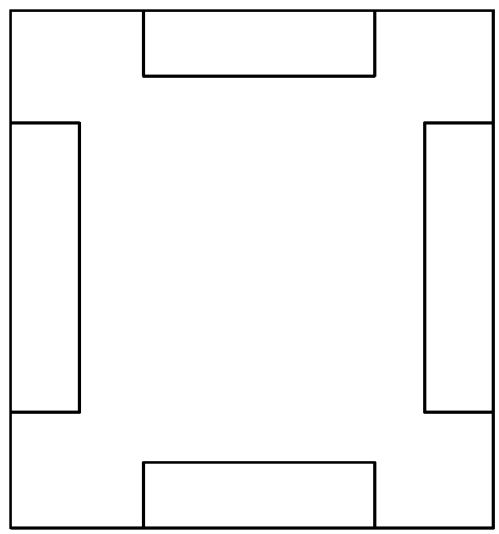
Figure 8A:
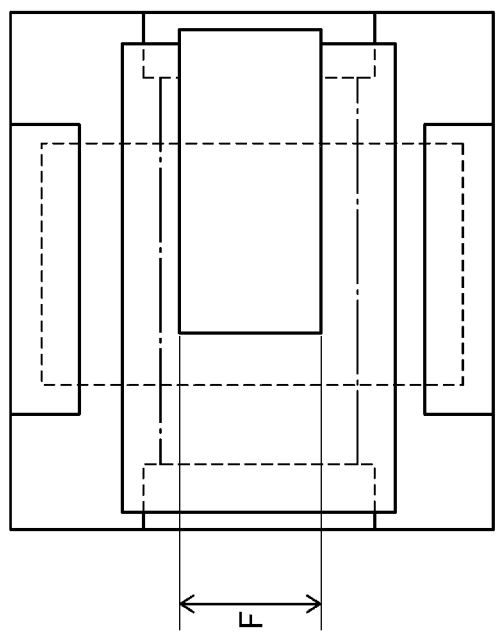
Figure 8B:
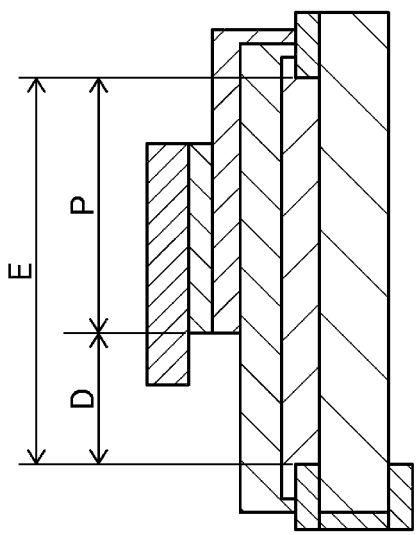

The protecting device shown in FIGS. 8A to 8C was used in Comparative Example 2. As with Comparative Example 1, the protecting device according to Comparative Example 2 also includes a rectangular heat-generator lead-out electrode (width: 0.21). The difference from Comparative Example 1 is that, in the protecting device according to Comparative Example 2, the heat-generator lead-out electrode does not protrude from the fuse element toward the heat-generator feeding electrode side. Thus, in Comparative Example 2, the distance D between the distal end portion of the heat-generator lead-out electrode and the heat-generator feeding electrode is 0.38, and the overlapping length P by which the heat-generator lead-out electrode overlaps the heat-generator is 0.62.

TABLE 2

| applied voltage[V] | | Ex. 1 (FIG. 1) | Comp. 1 (FIG. 25) | Comp. 2 (FIG. 8) |
| --- | --- | --- | --- | --- |
| 50 | spark | no | occur | no |
|  | rapid blowout | G | B | B |
| 100 | spark | no | occur | no |
|  | rapid blowout | G | B | B |
| 200 | spark | no | occur | no |
|  | rapid blowout | G | B | B |

Figure 9:
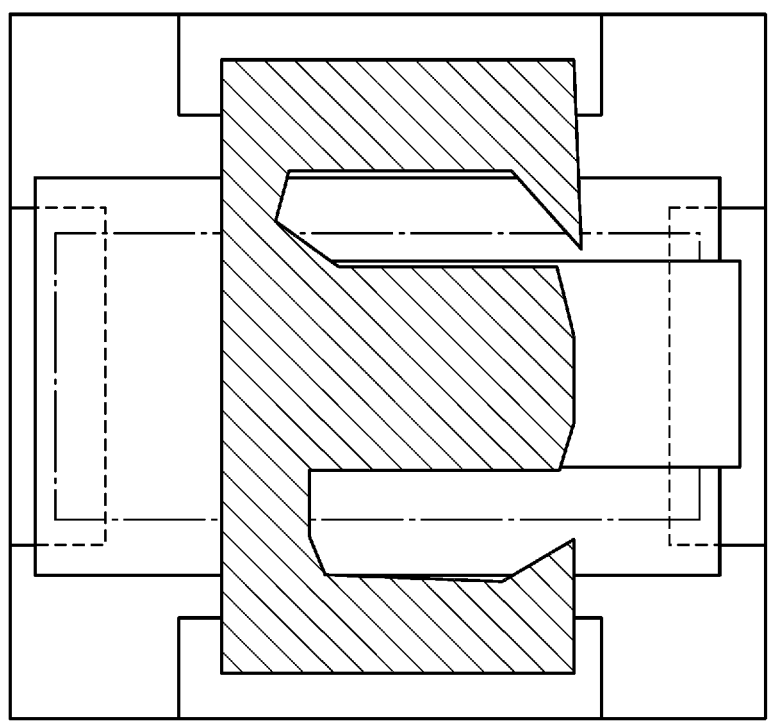
FIG. 9 is a plan view illustrating a state in which the fuse element remains unmelted and is not blown in a protecting device according to a comparative example.

As shown in Table 2, in Example 1, no spark was generated when any voltage was applied, and the fuse element could be blown within the predetermined time. On the contrary, in Comparative Example 1, a spark was generated when any voltage was applied, and the fuse element could not be blown within the predetermined time. In Comparative Example 2, although no spark was generated when any voltage was applied, since a rectangular heat-generator lead-out electrode having a narrow width of 0.21 was used, the capacity for holding the melted conductor of the fuse element was insufficient, and as shown in FIG. 9, the melted conductor continued between the first and second electrodes so that the fuse element could not be blown within the predetermined time.

Figure 10C:
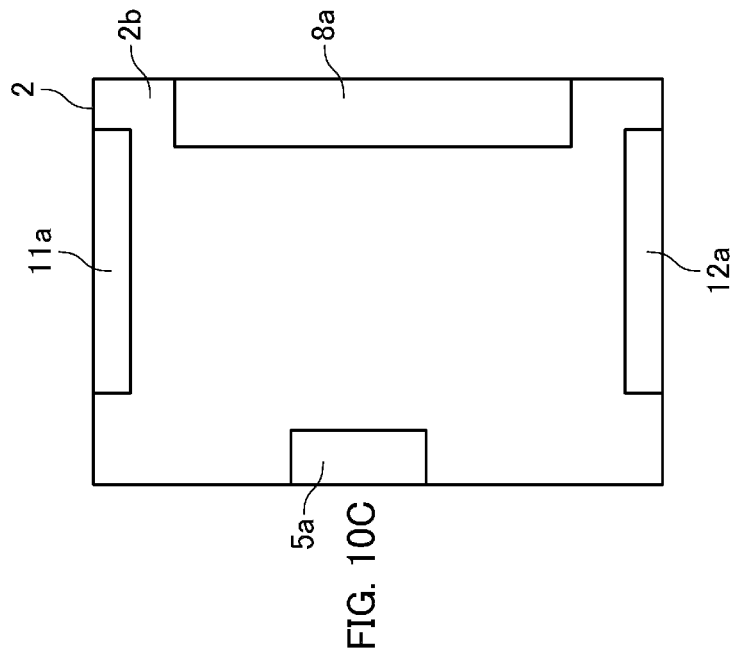
Figure 10A:
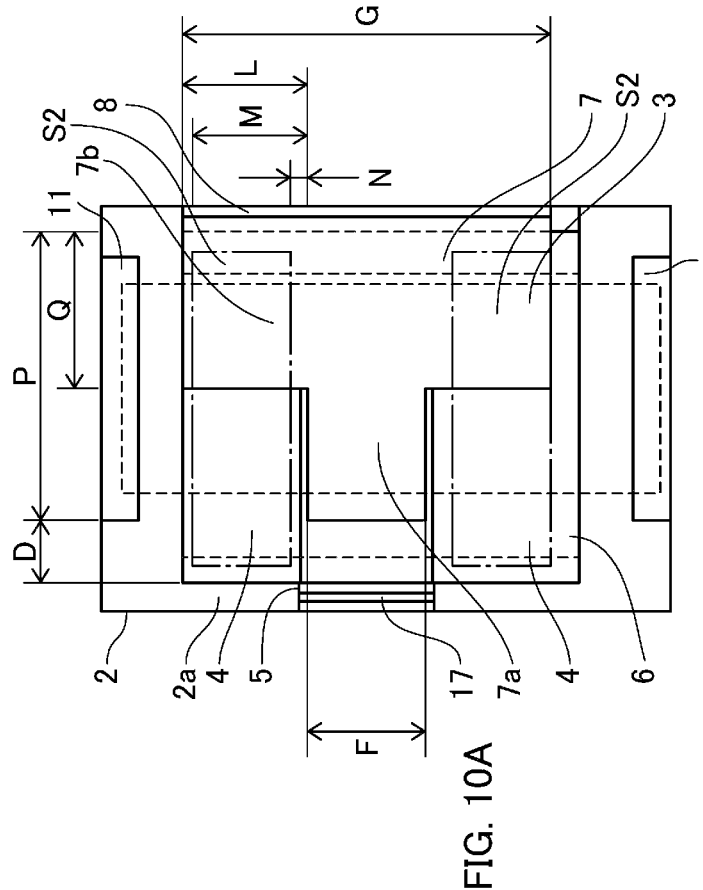
Figure 10B:
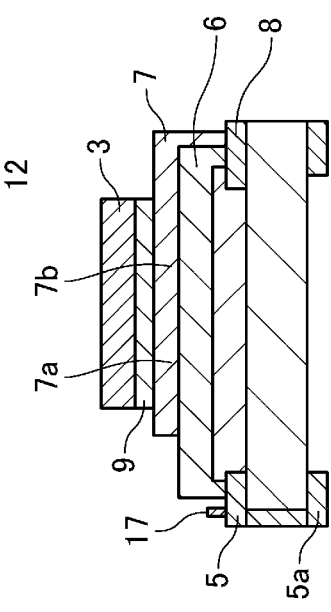

Second Embodiment: Configuration in which Heat Generators are Provided at Both Side on Front Surface Next, a second embodiment of the protecting device according to the present technology will be described. In the following description, the same components as those of the above-described protecting device 1 are designated by the same reference numerals, and the details thereof may be omitted. As shown in FIGS. 10A to 10C, the protecting device 30 according to the second embodiment includes: an insulating substrate 2; a fuse element 3 provided at the front surface 2a side of the insulating substrate 2; a plurality of heat-generators 4 formed on the insulating substrate 2 to blow the fuse element 3 by heat generation; a heat-generator feeding electrode 5 connected to one end of each of the heat-generators 4 and serving as power-feeding terminal for the heat-generators 4; an insulating layer 6 covering the heat-generators 4; and a heat-generator lead-out electrode 7 connected to the other end of each of the heat-generators 4 and formed along the heat-generators 4 on the insulating layer 6 to hold melted conductor 3a of the fuse element 3.

In the protecting device 30, the plurality of heat-generators 4 are provided on the insulating substrate 2 in parallel and spaced apart from each other. One end of each heat-generator 4 is connected to the heat-generator feeding electrode 5, and the other end thereof is connected to the heat-generator electrode 8. The heat-generator electrode 8 is connected to the heat-generator lead-out electrode 7. When each heat-generator 4 is energized through the heat-generator feeding electrode 5, the heat-generator feeding electrode 5 side thereof works as a high potential portion, and the heat-generator electrode 8 and the heat-generator lead-out electrode 7 side thereof works as a low potential portion. Each of the heat-generators 4 is covered with the insulating layer 6 and overlaps a heat-generator lead-out electrode 7 formed on the insulating layer 6.

The heat-generator lead-out electrode 7 on the protecting device 30 can be formed by a known method such as printing using a known electrode material such as Ag, Cu or an alloy material mainly composed of Ag or Cu.

The heat-generator lead-out electrode 7 has a distal end portion 7a extending in the high potential portion side of each of the heat-generators 4 and a proximal end portion 7b extending in the low potential portion side at the time of energization, and the overlapping area S1 in which the distal end portion 7a overlaps the heat-generator 4 is smaller than the overlapping area S2 in which the proximal end portion 7b overlaps the heat-generator 4. Thus, as with the protecting device 1, even when a high voltage is applied from an external circuit, the protecting device 30 is less likely to cause a spark (discharge) and can safely and quickly interrupt the current path.

In the protecting device 30 shown in FIGS. 10A to 10C, the heat-generator lead-out electrode 7 overlaps each of the heat-generators 4 at the proximal end portion 7b, and the distal end portion 7a is formed on a region between the two heat-generators 4, so that the distal end portion 7a does not overlap the two heat-generators 4. The distal end portion 7a of the heat-generator lead-out electrode 7 extends to the high potential portion side of the heat-generator 4, but does not overlap the overlapping area with the heat-generator 4, that is, the overlapping area with the heat-generator 4 is zero, and is smaller than the overlapping area in which the heat-generator 4 overlaps the proximal end portion 7b. As a result, the distance between the distal end portion 7a and the high potential portion of the heat-generator 4 and the facing area (overlapping area) are reduced, so that the discharge path is less likely to be formed and the spark is less likely to occur.

Figure 11:
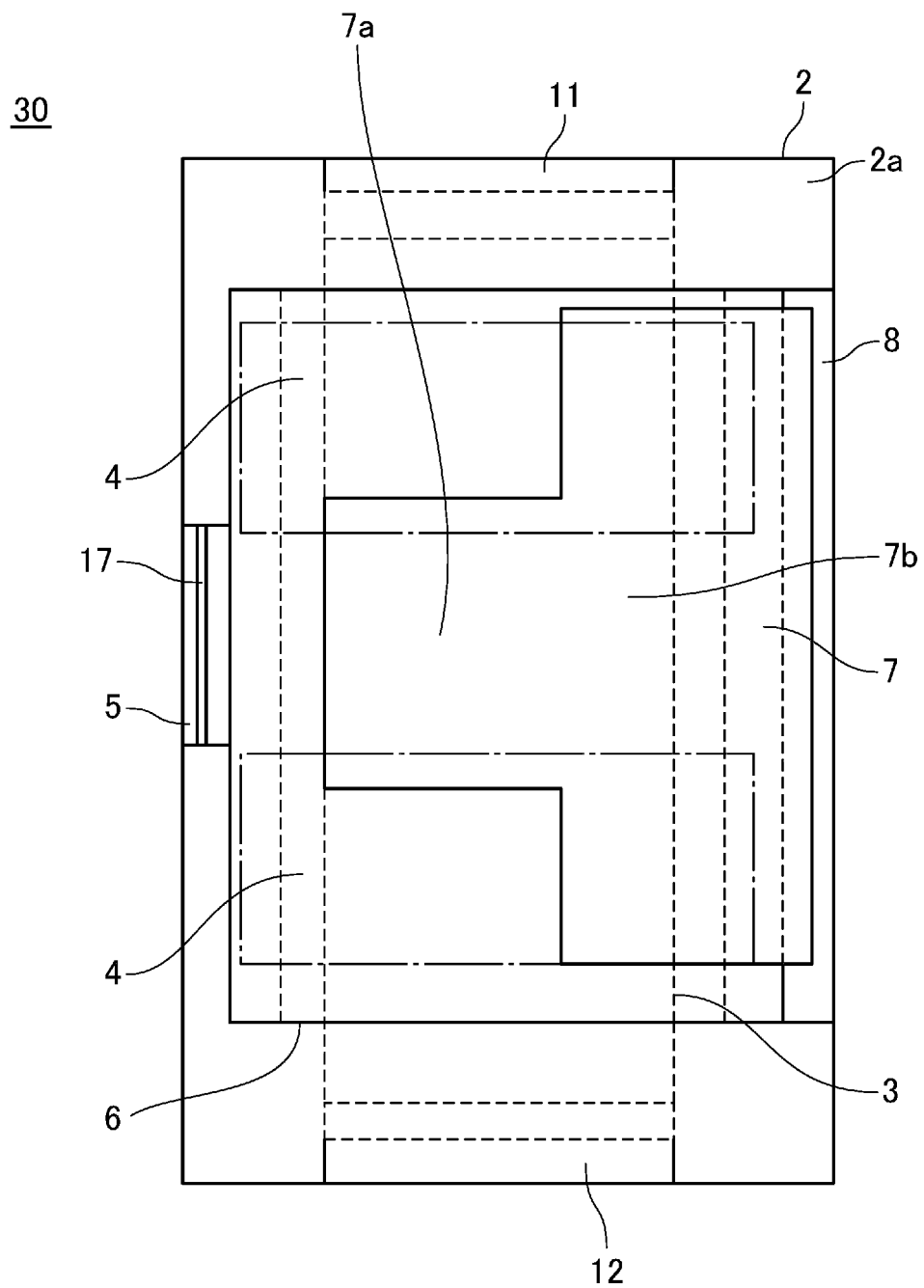
FIG. 11 is a plan view illustrating a modification of the heat-generator lead-out electrode in the protecting device according to the second embodiment.

In the protecting device 30, as shown in FIG. 11, the distal end portion 7a of the heat-generator lead-out electrode 7 may be formed on a region between the two heat-generators 4, and a part of the distal end portion 7a may overlap at least one, preferably, the two heat-generators 4. In the protecting device 30 having the structure shown in FIG. 11 as well, the overlapping area S1 in which the distal end portion 7a overlaps the heat-generator 4 is smaller than the overlapping area S2 in which the proximal end portion 7b overlaps the heat-generator 4, so that even when a high voltage is applied, a spark (discharge) is less likely to occur and the current path can be interrupted safely and quickly. Further, since the distal end portion 7a partially overlaps the heat-generator 4, heat of the heat-generator 4 is efficiently transferred to the distal end portion 7a, and the fuse element 3 can be heated more quickly.

Figure 12:
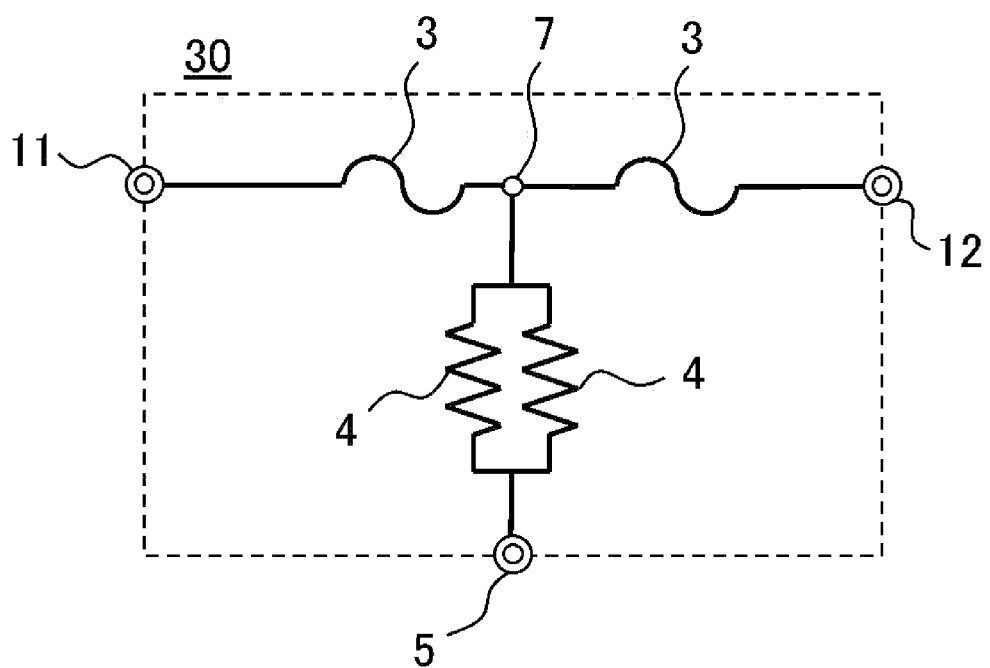
FIG. 12 is a circuit diagram of a protecting device according to the second embodiment.

FIG. 12 is a circuit diagram of the protecting device 30. In the protecting device 30, one end of each of the plurality of heat-generators 4 is connected to a power source for generating heat of the heat-generators 4 through the heat-generator feeding electrode 5 formed on an insulating substrate 2, and the other end of each of the heat-generators 4 is connected to the fuse element 3 through the heat-generator lead-out electrode 7.

Modifications of Heat-Generator Lead-Out Electrode 7

Figure 13:
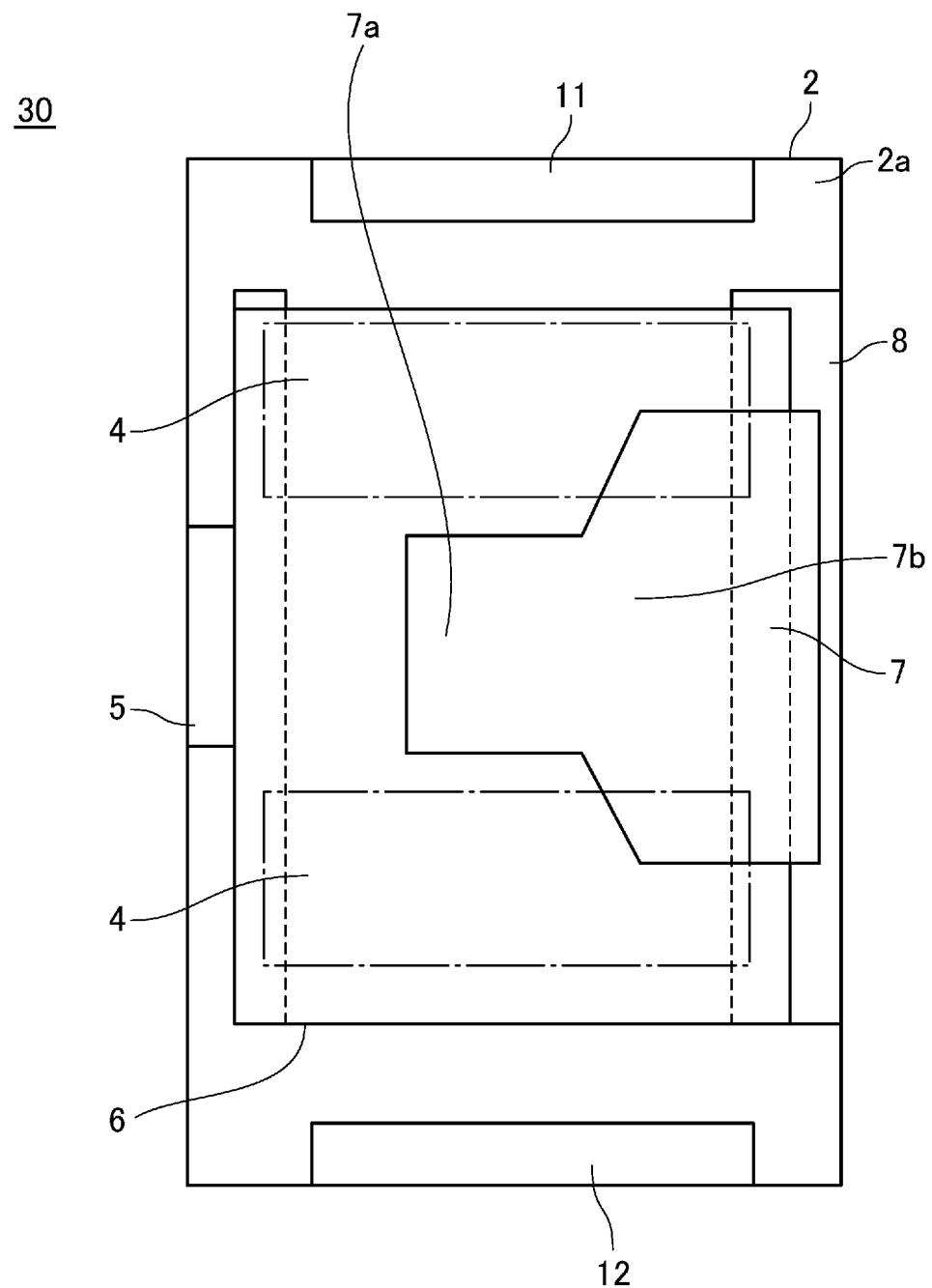
FIG. 13 is a plan view illustrating a modification of the heat-generator lead-out electrode in the protecting device according to the second embodiment.
Figure 14:
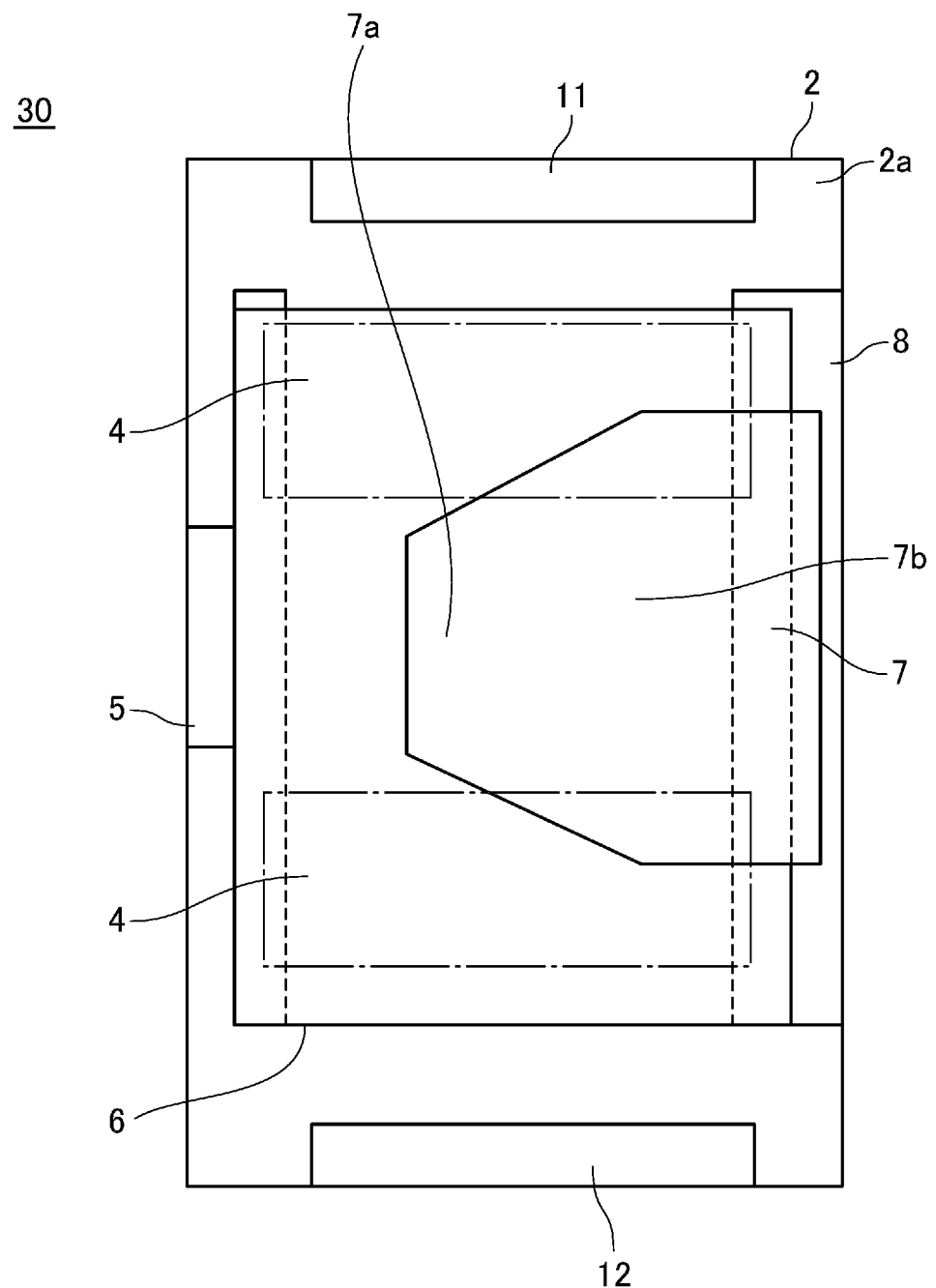
FIG. 14 is a plan view illustrating a modification of the heat-generator lead-out electrode in the protecting device according to the second embodiment.

FIGS. 13 and 14 illustrate modifications of the heat-generator lead-out electrode 7. As shown in FIG. 13, the heat-generator lead-out electrode 7 may have a distal end portion 7a formed in a rectangular shape, and the distal end portion 7a and the proximal end portion 7b may be connected to each other via inclined portions. In addition, the heat-generator lead-out electrode 7 may have a distal end portion 7a formed into a substantially trapezoidal shape as shown in FIG. 14 or a triangular shape.

Figure 15C:
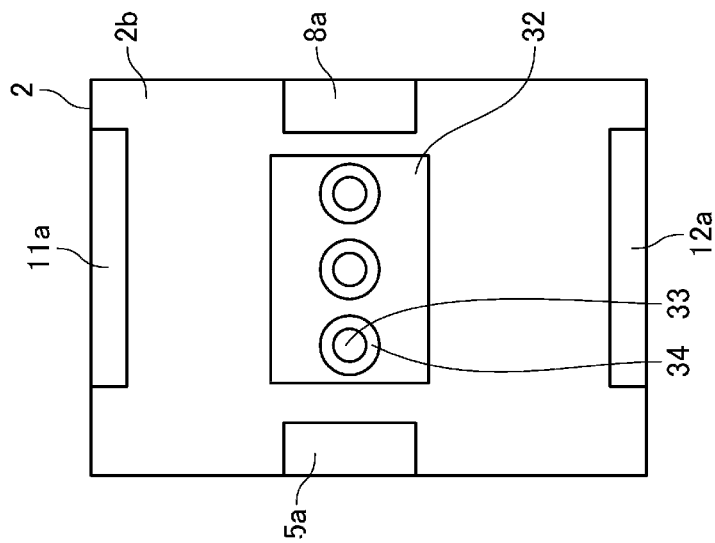
Figure 15A:
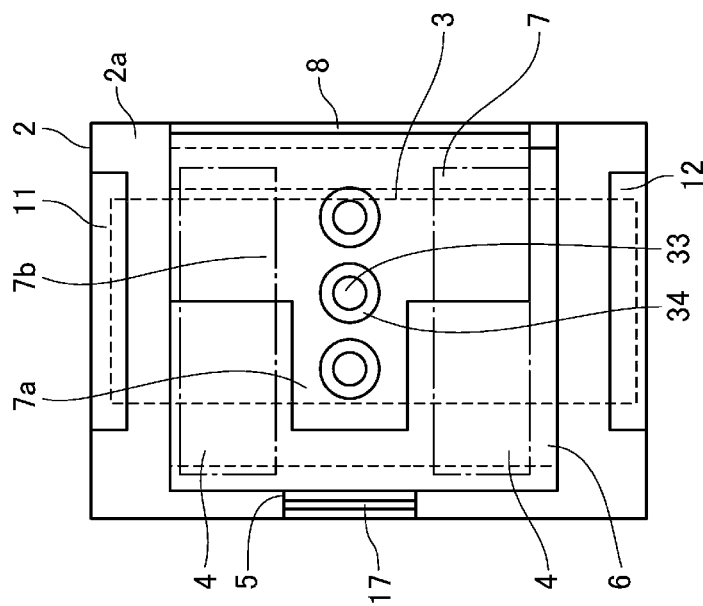
Figure 15B:
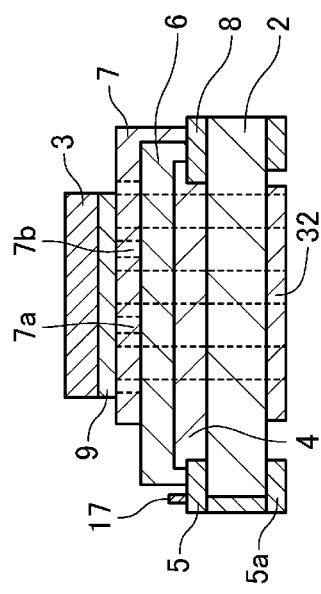

Further, as shown in FIGS. 15A to 15C, the protecting device 30 may have a holding electrode 32 for holding the melted conductor 3a of the fuse element 3 formed on the rear surface 2b of the insulating substrate 2, the heat-generator lead-out electrode 7 and the holding electrode 32 may be continued through the through-hole 33 penetrating the insulating substrate 2, and the melted conductor 3a of the melted fuse element 3 may be sucked to the holding electrode 32 side through the through-hole 33.

Figure 16A:
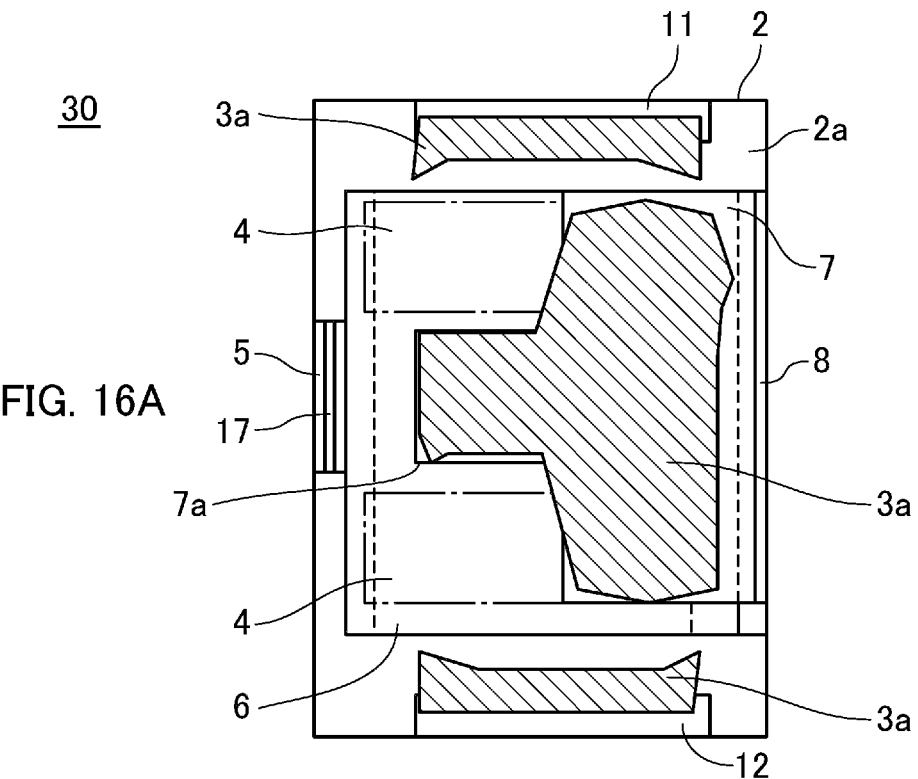
Figure 16B:
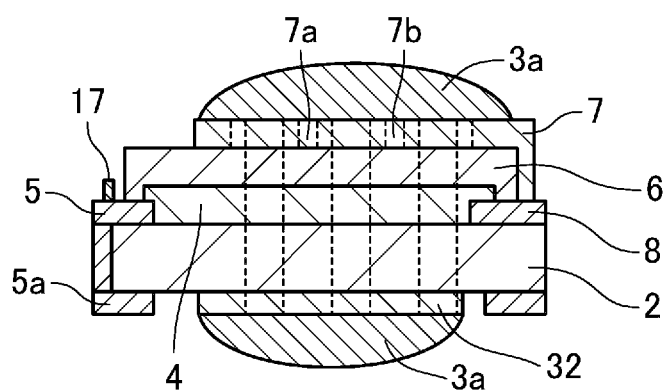

When the fuse element 3 melts, the through-hole 33 sucks the melted conductor 3a by a capillary phenomenon, thereby reducing the volume of the melted conductor 3a held on the heat-generator lead-out electrode 7. Thus, as shown in FIGS. 16A and 16B, even when the fuse element 3 increases in size in accordance with the increase in rating and capacity of the protecting device, a large amount of the melted conductor 3a can be held by the holding electrode 32, the heat-generator lead-out electrode 7, and the first and second electrodes 11, 12, and the fuse element 3 can be surely blown.

As with the heat-generator lead-out electrode 7, the holding electrode 32 can be formed by a known method such as printing using a known electrode material such as Ag or Cu or an alloy material mainly composed of Ag or Cu.

On the inner surface of the through-hole 33, a conductive layer 34 is formed. By forming the conductive layer 34, the through-hole 33 can easily suck the melted conductor 3a. The conductive layer 34 is formed of, for example, any one of copper, silver, gold, iron, nickel, palladium, lead, tin, or an alloy containing any one of them as a main component, and can be formed on the inner surface of the through-hole 33 by known methods such as electroplating or printing of conductive paste. The conductive layer 34 may be formed by inserting a plurality of metal wires or an assembly of conductive ribbons into the through-hole 33.

The conductive layer 34 of the through-hole 33 is continuous with the heat-generator lead-out electrode 7 formed on the front surface 2a of the insulating substrate 2. The heat-generator lead-out electrode 7 supports the fuse element 3 and the melted conductor 3a is aggregated thereon at the time of blowout, and the heat-generator lead-out electrode 7 and the conductive layer 34 are continuous, so that the melted conductor 3a can be easily guided into the through-hole 33.

The conductive layer 34 of the through-hole 33 is connected to the holding electrode 32 formed on the rear surface 2b of the insulating substrate 2. Thus, when the fuse element 3 melts, the melted conductor 3a sucked through the through-hole 33 can be aggregated onto the holding electrode 32 (see FIGS. 16A and 16B), and more amount of melted conductor 3a can be sucked, thereby reducing the volume of the melted conductor 3a held by the heat-generator lead-out electrode 7 and the first and second electrodes 11, 12 at the melting portion of the fuse element 3.

It should be noted that, forming a plurality of through-holes 33 in the protecting device 30 can increase the number of paths for sucking the melted conductor 3a of the fuse element 3 to suck more amount of the melted conductor 3a, thereby reducing the volume of the melted conductor 3a at the melting portion.

Modifications of Heat-Generator

Figure 17A:
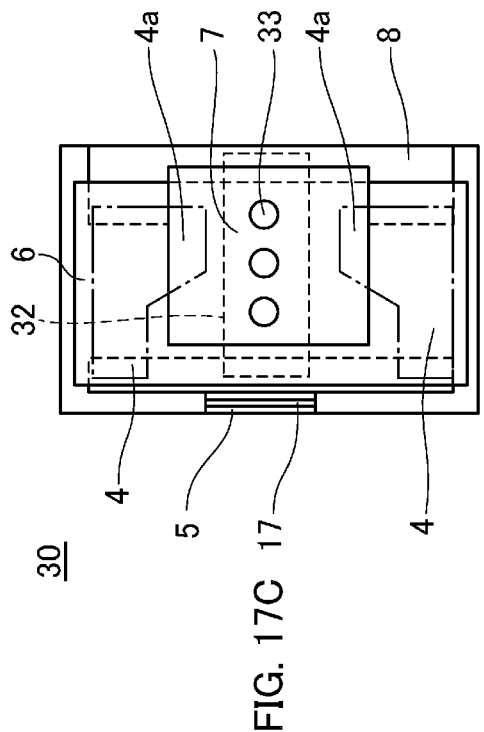
FIGS. 17A to 17D are plan views illustrating modifications of the heat-generator in the protecting device according to the second embodiment.
Figure 17B:
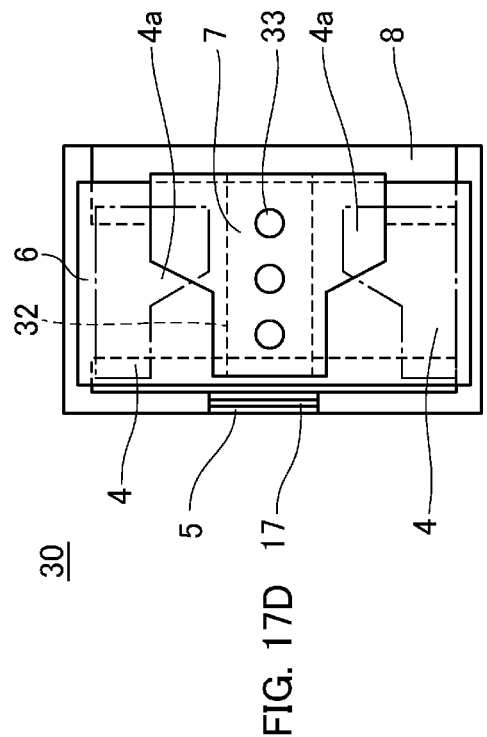
Figure 17C:
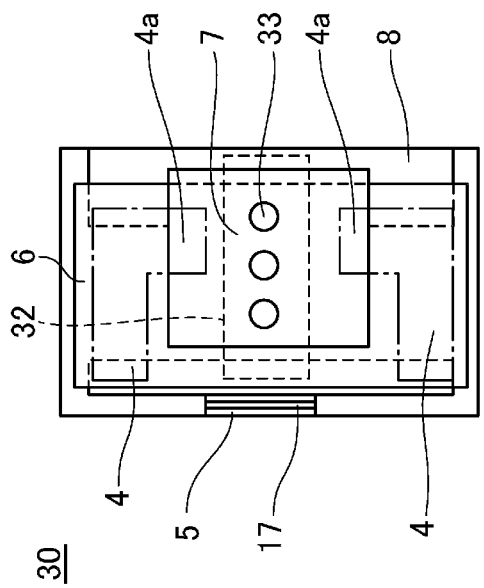
Figure 17D:
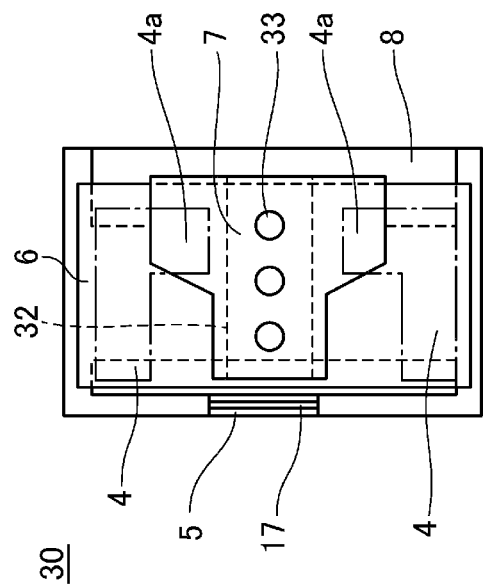

In the protecting device 30, the plurality of the heat-generators 4 may be formed, in addition to a substantially rectangular shape, in an L-shape so as to have an overhang portion 4a that overlaps an end portion of the low potential portion side as shown in FIGS. 17A to 17D, and the two overhang portions 4a may be formed to face each other. The overhang portion 4a may be formed substantially perpendicular to the longitudinal direction of the heat-generator 4 as shown in FIGS. 17A and 17B, or may have a tapered portion as shown in FIGS. 17C and 17D. The heat-generator lead-out electrode 7 or the holding electrode 32 may overlap the overhang portion 4a.

Figure 18A:
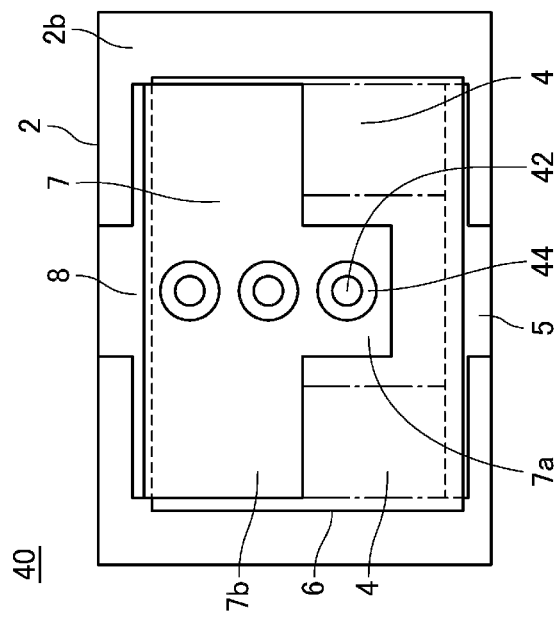
Figure 18B:
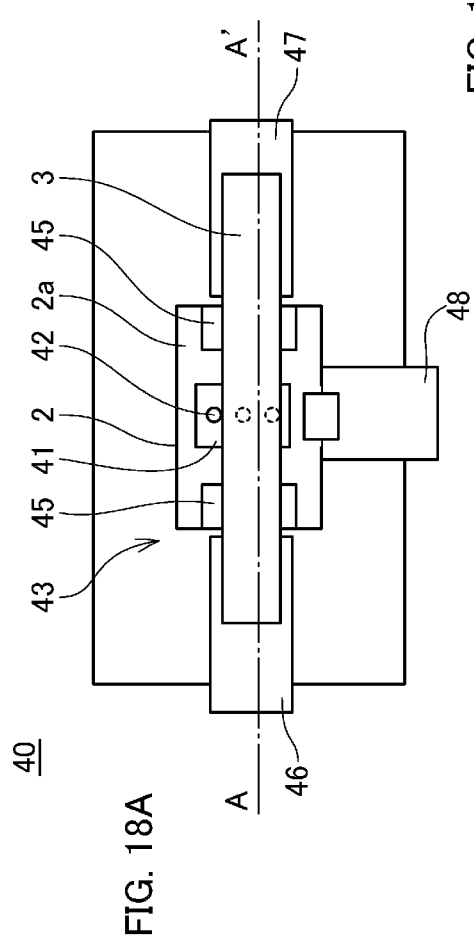
Figure 18C:
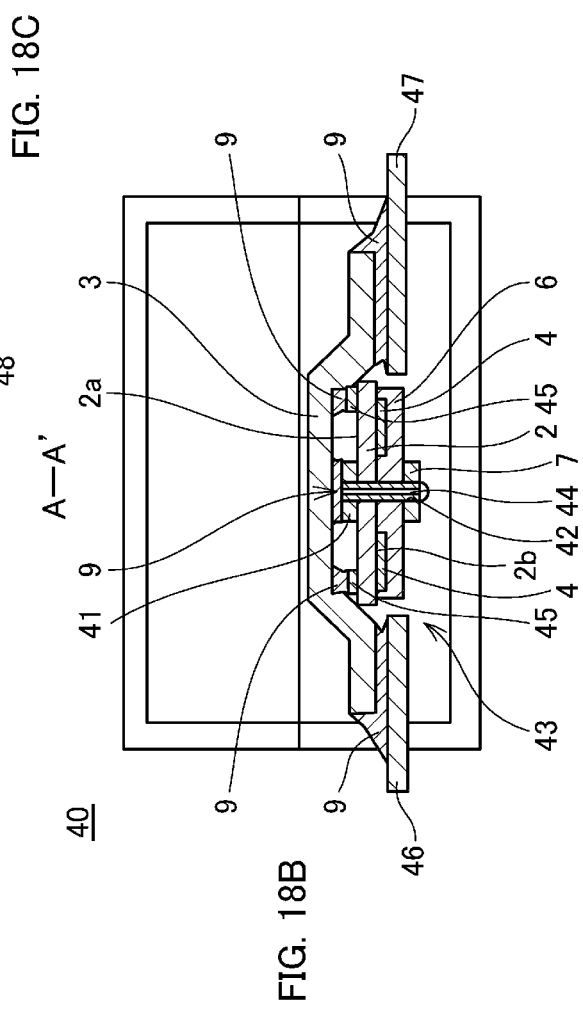

Third Embodiment: Configuration in which Heat-Generator is Provided on Rear Surface Next, a third embodiment of the protecting device according to the present technology will be described. In the following description, the same components as those of the protecting devices 1, 30 are designated by the same reference numerals, and the details thereof may be omitted. As shown in FIGS. 18A and 18B, the protecting device 40 according to the third embodiment includes: an insulating substrate 2; a fuse element 3 provided at the front surface 2a side of the insulating substrate 2; a plurality of heat-generators 4 formed on the insulating substrate 2 to blow the fuse element 3 by heat generation; a heat-generator feeding electrode 5 connected to one end of each of the heat-generators 4 and serving as a power-feeding terminal to the heat-generator 4; an insulating layer 6 covering the heat-generator 4; and a heat-generator lead-out electrode 7 connected to the other end of each of the heat-generators 4 and formed along the heat-generator 4 on the insulating layer 6 to hold melted conductor 3a of the fuse element 3.

In the protecting device 40, the heat-generator 4, the heat-generator feeding electrode 5, and the heat-generator lead-out electrode 7 are formed on the rear surface 2b opposite to the front surface 2a of the insulating substrate 2 provided with the fuse element 3, and a supporting electrode 41 for supporting the fuse element 3 is formed on the front surface 2a of the insulating substrate 2. The heat-generator lead-out electrode 7 formed on the rear surface 2b and the supporting electrode 41 are connected through a through-hole 42 penetrating the insulating substrate 2, whereby the insulating substrate 2 constitutes a blow-out member 43 for sucking the melted conductor 3*a* of the melted fuse element 3 to the heat-generator lead-out electrode 7 side through the through-hole 42 to blow the fuse element 3.

One end of each heat-generator 4 is connected to the heat-generator feeding electrode 5, and the other end thereof is connected to the heat-generator electrode 8. The heat-generator electrode 8 is connected to the heat-generator lead-out electrode 7. When each heat-generator 4 is energized through the heat-generator feeding electrode 5, the heat-generator feeding electrode 5 side thereof works as a high potential portion, and the heat-generator electrode 8 and the heat-generator lead-out electrode 7 side thereof works as a low potential portion. Each of the heat-generators 4 is covered with the insulating layer 6 and overlaps a heat-generator lead-out electrode 7 formed on the insulating layer 6.

The heat-generator lead-out electrode 7 has a distal end portion 7*a* extending in the high potential section side of each heat-generator 4 and a proximal end portion 7*b* extending in the low potential portion side at the time of energization, and the overlapping area S1 in which the distal end portion 7*a* overlaps the heat-generator 4 is smaller than the overlapping area S2 in which the proximal end portion 7*b* overlaps the heat-generator 4. Thus, as with the protecting device 1, even when a high voltage is applied from an external circuit, the protecting device 20 is less likely to cause a spark (discharge) and can safely and quickly interrupt the current path. In the protecting device 40, as in the protecting device 30, the heat-generator lead-out electrode 7 may have various configurations shown in FIGS. 10 to 13.

The supporting electrode 41 is connected to the fuse element 3 through a bonding material such as the connection solder 9, and when the fuse element 3 melts, the melted conductor 3*a* is aggregated and held on the supporting electrode 41. Further, the supporting electrode 41 is formed with a through-hole 42 for sucking the melted conductor 3*a* of the fuse element 3 by a capillary phenomenon, thereby reducing the volume of the melted conductor 3*a* held on the supporting electrode 41. As shown in FIG. 19, in the protecting device 40, even when the amount of the melted conductor 3*a* increases by increasing the cross-sectional area of the fuse element 3 in order to cope with a large current application, the melted conductor 3*a* is sucked into the through-hole 42 and held by the heat-generator lead-out electrode 7, so that it is possible to reduce the amount of the melted conductor 3*a* held by the supporting electrode 41 and surely blow the fuse element 3.

As with the heat-generator lead-out electrode 7, the supporting electrode 41 can be formed by a known method such as printing using a known electrode material such as Ag, Cu or an alloy material mainly composed of Ag or Cu.

In addition, as with the through-hole 33 described above, the through-hole 42 has a conductive layer 44 formed on its inner surface, which is continuous with the supporting electrode 41 and the heat-generator lead-out electrode 7. Since the conductive layer 44 has the same structure and function as the conductive layer 34 described above, details thereof are omitted. Further, forming a plurality of through-holes 42 in the protecting device 40 can increase the number of paths for sucking the melted conductor 3*a* of the fuse element 3 to suck more amount of melted conductor 3*a*, thereby reducing the volume of the melted conductor 3*a* at the melting portion.

On the front surface 2*a* of the insulating substrate 2, an auxiliary electrode 45 is provided which is connected to the fuse element 3 and holds the melted conductor 3*a* together with the supporting electrode 41. The fuse element 3 is connected to first and second electrode terminals 46, 47 that are provided separately from the insulating substrate 2 and connected to an external circuit through a bonding material such as the connection solder 9. Similarly, the heat-generator feeding electrode 5 is connected to the third electrode terminal 48 that is provided separately from the insulating substrate 2 and connected to the external circuit.

The insulating substrate 2 having such a configuration constitutes a blow-out member 43 in which the auxiliary electrode 45 and the supporting electrode 41 are connected to the fuse element 3 through a bonding material, the energized heat-generator 4 generates heat to melt the fuse element 3 by this heat, and the melted conductor 3*a* is sucked to the heat-generator lead-out electrode 7 side through the through-hole 42.

Figure 21:
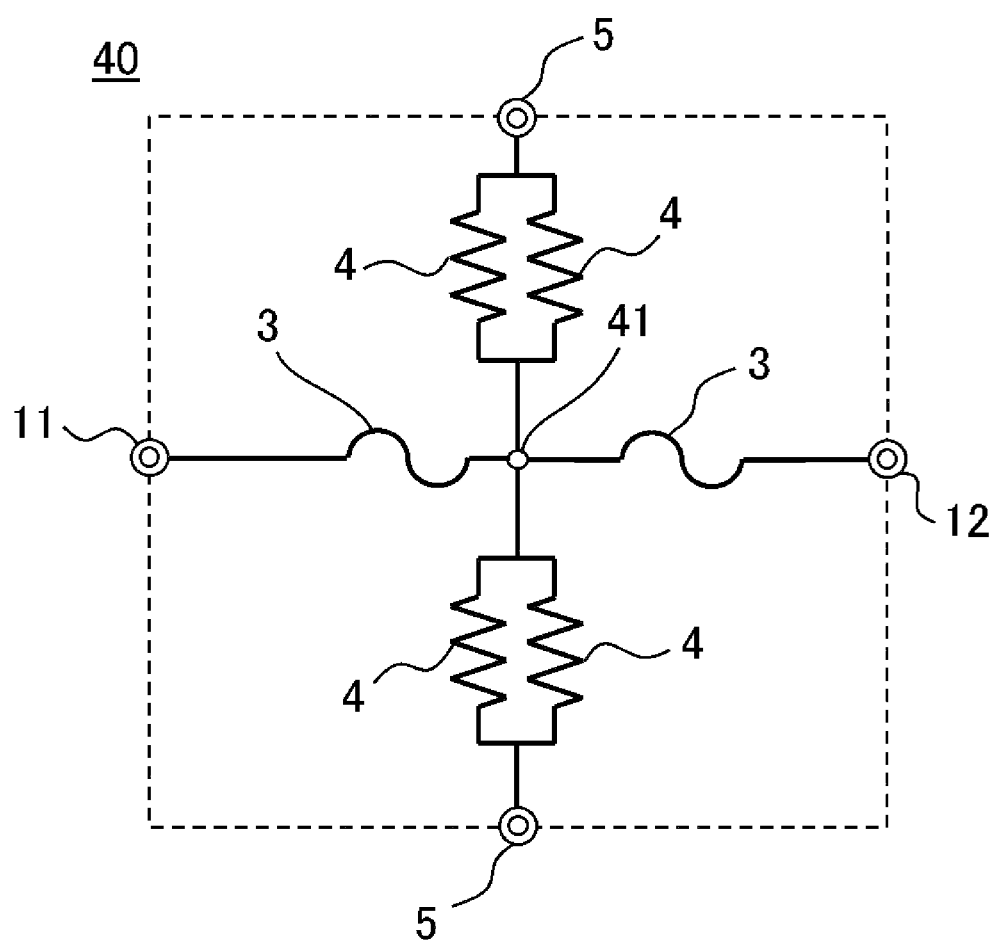
FIG. 21 is a circuit diagram of the protecting device shown in FIG. 20.

As shown in FIG. 20, the protecting device 40 may hold the fuse element 3 between the plurality of blow-out members 43. In the protecting device 40 shown in FIG. 20, the blow-out members 43 are disposed on one side and the other side of the fuse element 3, respectively. FIG. 21 is a circuit diagram of the protecting device 40. In each of the blow-out members 43 respectively disposed on the front surface and rear surface of the fuse element 3, one end of each of the heat-generators 4 is connected to the fuse element 3 via the heat-generator lead-out electrode 7 and the supporting electrode 41 formed on each of the insulating substrates 2, and the other end of each of the heat-generators 4 is connected to a power source for causing the heat-generator 4 to generate heat via a heat-generator feeding electrode 5 formed on each of the insulating substrates 2.

Figure 22:
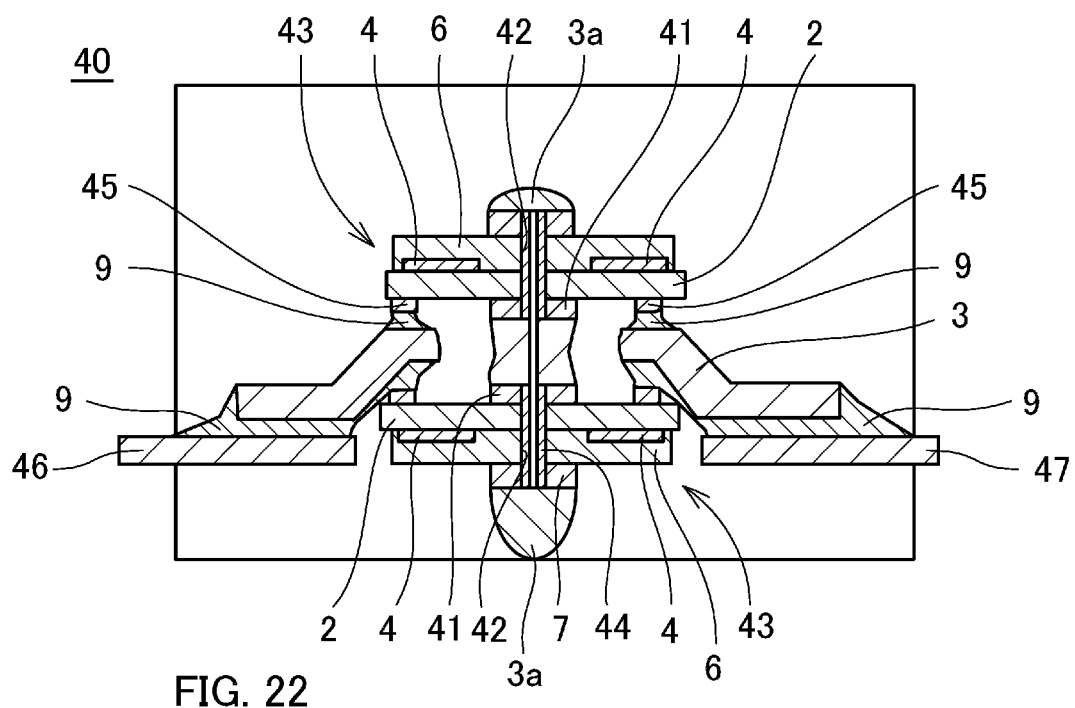
FIG. 22 is a cross-sectional view illustrating a state in which the fuse element is blown in the protecting device shown in FIG. 20.

As shown in FIG. 22, in the protecting device 40, when the fuse element 3 is blown by the heat generation of the heat-generator 4, the heat-generators 4 of the blow-out members 43, 43 connected to both sides of the fuse element 3 heat both sides of the fuse element 3. Therefore, even when the cross-sectional area of the fuse element 3 is increased to cope with a large current application, the protecting device 40 can quickly heat and blow the fuse element 3.

Further, the protecting device 40 sucks the melted conductor 3*a* from both sides of the fuse element 3 into each through-hole 42 formed in the insulating substrate 2 of each of the blow-out members 43. Accordingly, even when the cross-sectional area of the fuse element 3 is increased in order to cope with a large current application so that a large amount of the melted conductor 3*a* is generated, the protecting device 40 can surely blow the fuse element 3 by sucking the melted conductor 3*a* by the plurality of blow-out members 43. In addition, the protecting device 40 can blow the fuse element 3 more quickly by sucking the melted conductor 3*a* by the plurality of blow-out members 43.

The protecting device 40 can also quickly blow the fuse element 3 in a case where the fuse element 3 has a covering structure in which a low melting point metal constituting an inner layer is covered with a high melting point metal. In this case, even when the heat-generator 4 generates heat, it takes time for the fuse element 3 coated with the high melting point metal to be heated to a temperature at which the high melting point metal of the outer layer melts. Here, the protecting device 40 includes a plurality of blow-out members 43, and simultaneously generates heat in the respective heat-generators 4 to quickly heat the high melting point metal of the outer layer to the melting temperature. Therefore, according to the protecting device 40, the thickness of the high melting point metal layer constituting the outer layer can be increased, and the rapid blowout property can be maintained while achieving further high rating.

As shown in FIG. 20, in the protecting device 40, it is preferable that the pair of blow-out members 43, 43 connected to the fuse element 3 face each other. Thus, the protecting device 40 can simultaneously heat the same part of the fuse element 3 from both sides and suck the melted conductor 3a by the pair of blow-out members 43, 43, and can heat and blow the fuse element 3 more quickly.

Further, in the protecting device 40, the auxiliary electrodes 45 and the supporting electrodes 41 formed on each of the insulating substrate 2 of the pair of blow-out members 43, 43 are preferably face each other via the fuse element 3. Thus, since the pair of blow-out members 43, 43 are connected symmetrically, the load applied to the fuse element 3 does not become unbalanced in reflow mounting or the like, and resistance to deformation can be improved.

In any case where the heat-generator 4 is formed on the front surface 2a and/or the rear surface 2b of the insulating substrate 2, it is preferable to form the heat-generator 4 on both sides of the through-hole 42 in order to heat the supporting electrode 41 and the heat-generator lead-out electrode 7 and to aggregate and suck more amount of the melted conductor 3a.

Second Example

Next, an embodiment of the protecting device 30 will be described. In the second example, the protecting device 30 shown in FIGS. 10A to 10C and a protecting device provided with a rectangular heat-generator lead-out electrode shown in FIGS. 26 and 23A to 23C were prepared, and the presence or absence of a spark was determined by applying voltages of 50V, 100V, and 200V, respectively. The blowout time of the fuse element was measured and the cases in which the fuse element was blown within a predetermined time (60 seconds) were evaluated as "G" (good), and the cases in which the fuse element was not blown within a predetermined time were evaluated as "B" (bad).

The dimensions of each part of the protecting device according to Examples and Comparative examples are defined as follows. The numerical values of the respective parts shown in Table 3 are numerical values indicating the ratio when E in Example 2 is regarded as 1.

D: distance between the distal end portion of the heat-generator lead-out electrode and the heat-generator feeding electrode
E: length of the heat-generator in the energizing direction
F: minimum width of the heat-generator lead-out electrode
G: maximum width of the heat-generator lead-out electrode
L: width between the side edge of the distal end portion and the side edge of the proximal end portion of the heat-generator lead-out electrode
M: width between the outer side edge of the heat-generator and the side edge (of the distal end portion) of the heat-generator lead-out electrode
N: distance in the heat-generator width direction between the side edge (of the distal end portion) of the heat-generator lead-out electrode and the side edge of the heat-generator
P: length of the heat-generator lead-out electrode
Q: overlapping length by which the heat-generator lead-out electrode overlaps the heat-generator

TABLE 3

|   | Ex.2 | Comp.3 | Comp.4 |
|---|---|---|---|
| D | 0.04 | 0.04 | 0.04 |
| E | 1 | 1 | 1 |
| F | 0.21 | 0.44 | 0.21 |
| G | 0.71 | 0.44 | 0.21 |
| L | 0.25 | 0 | 0 |
| M | 0.55 | 0.28 | 0.55 |
| N | 0.04 | 0.1 | 0.07 |
| P | 0.96 | 0.96 | 0.96 |
| Q | 0.54 | 0.96 | 0 |

Example 2

The protecting device shown in FIGS. 10A to 10C was used in Example 2. In the protecting device according to Example 2, a proximal end portion (width G: 0.71) and a distal end portion (width F: 0.21) are provided in the heat-generator lead-out electrode, and the proximal end portion is formed 0.25 wider than the distal end portion at one side. The heat-generator lead-out electrode does not protrude from the fuse element toward the heat-generator feeding electrode side, the distance D between the distal end portion of the heat-generator lead-out electrode and the heat-generator feeding electrode is 0.04, and the overlapping length Q by which the heat-generator lead-out electrode overlaps the heat-generator is 0.54.

Comparative Example 3

Figure 26C:
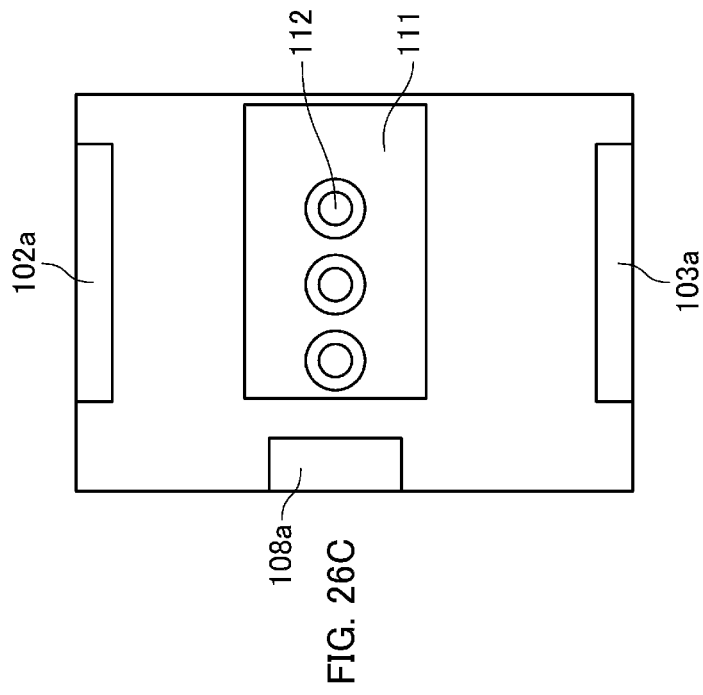
Figure 26A:
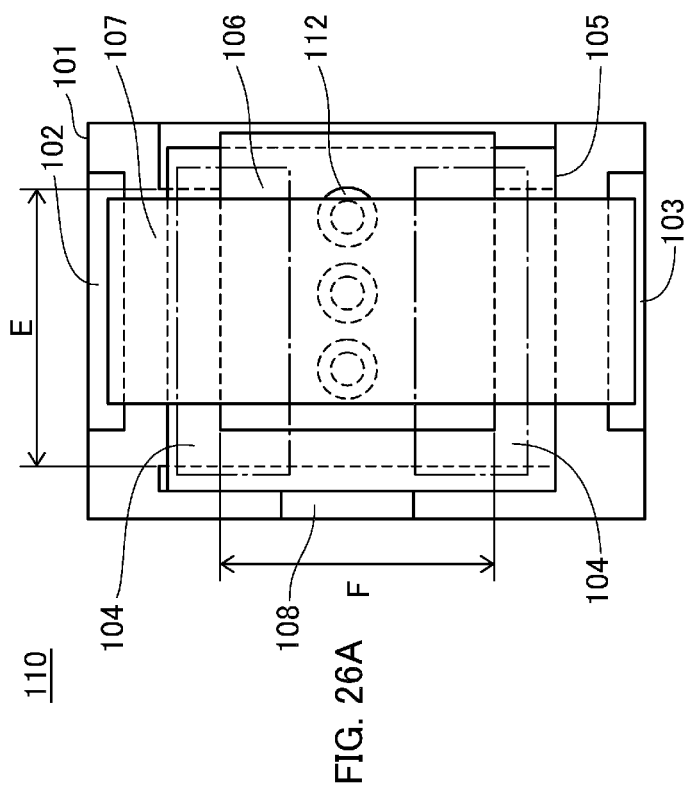
Figure 26B:
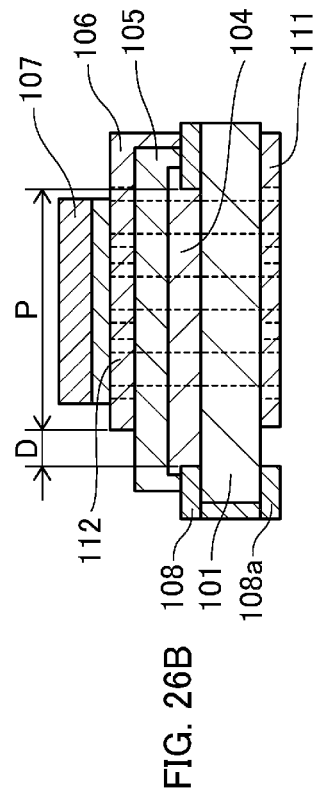
Figure 27:
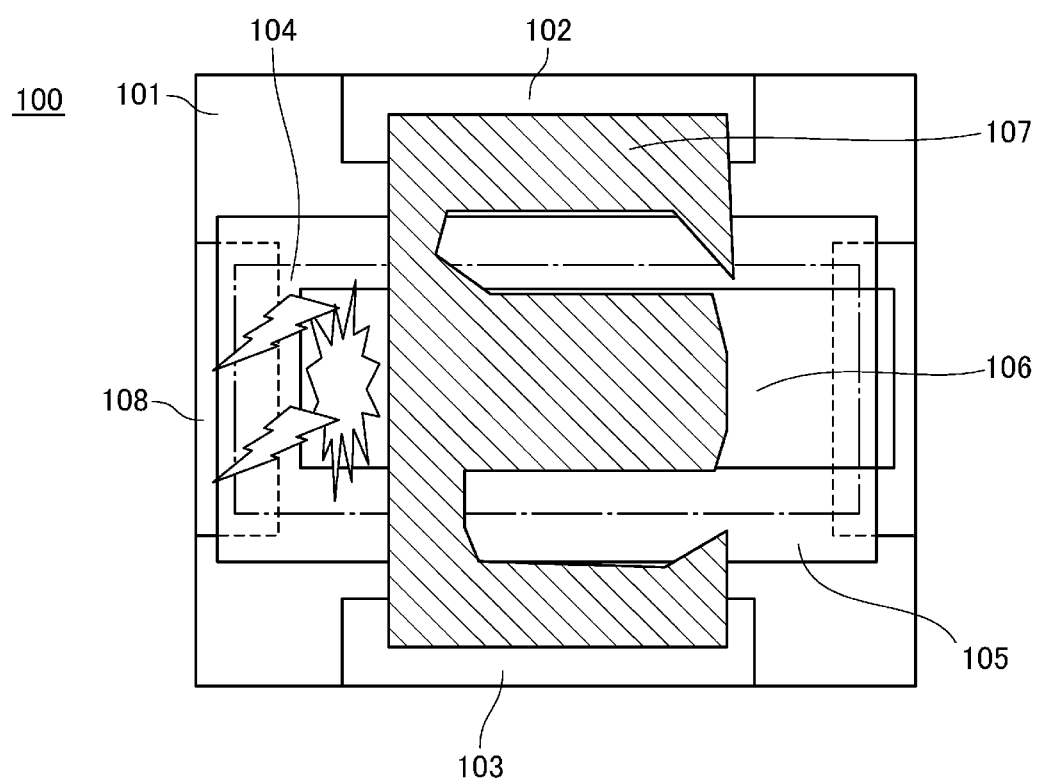
FIG. 27 is a plan view illustrating a state in which a spark occurs in the protecting device shown in FIGS. 25A to 25C.
Figure 28:
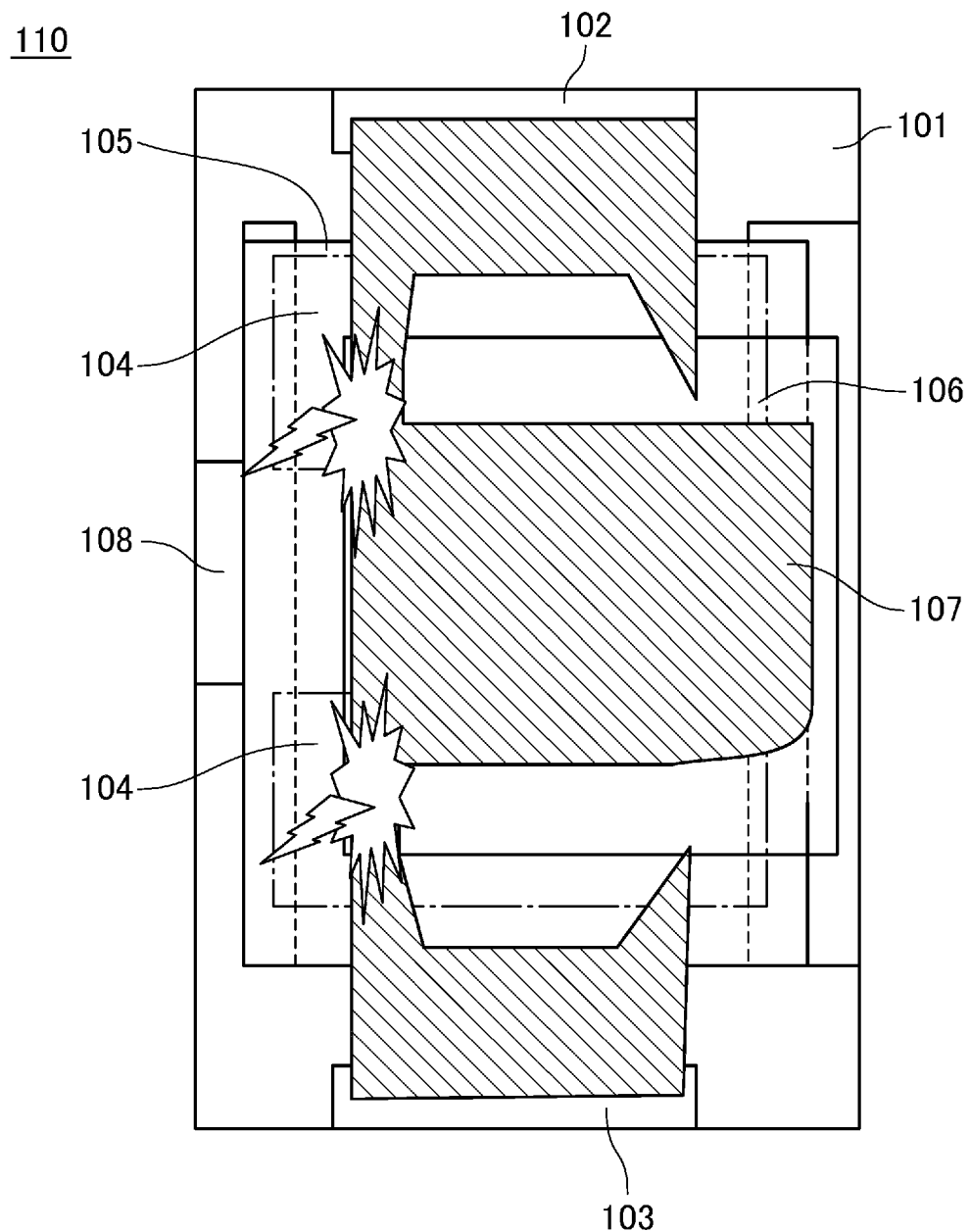
FIG. 28 is a plan view illustrating a state in which a spark occurs in the protecting device shown in FIGS. 26A to 26C.
Figure 29:
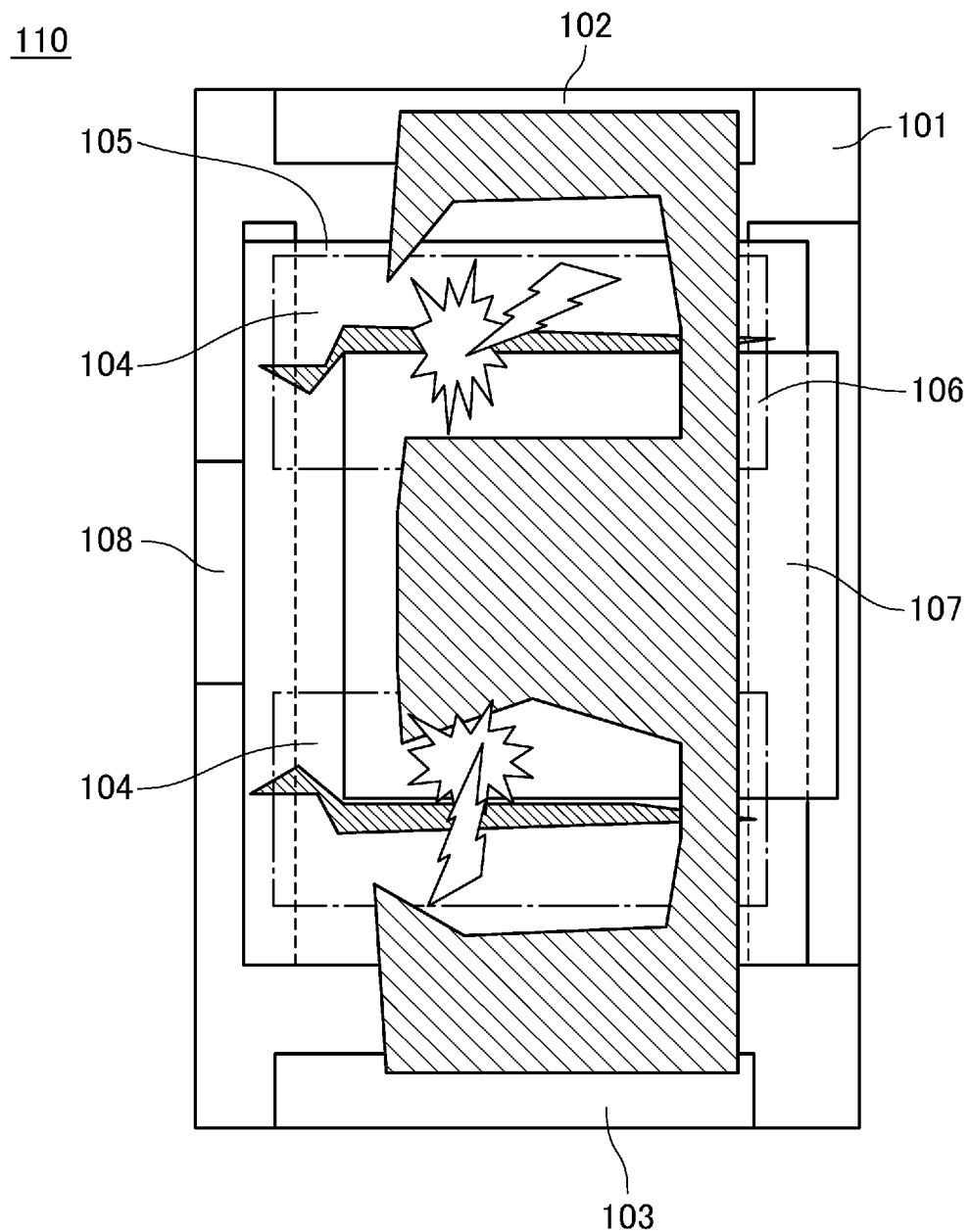
FIG. 29 is a plan view illustrating a state in which a spark occurs in the protecting device shown in FIGS. 26A to 26C.

The protecting device shown in FIGS. 26A to 26C was used in Comparative Example 3. In the protecting device according to Comparative Example 3, a rectangular heat-generator lead-out electrode (width: 0.44) is formed. The heat-generator lead-out electrode does not protrude from the fuse element toward the heat-generator feeding electrode side, the distance D between the distal end portion of the heat-generator lead-out electrode and the heat-generator feeding electrode is 0.04, and the overlapping length Q by which the heat-generator lead-out electrode overlaps the heat-generator is 0.96.

Comparative Example 4

The protecting device shown in FIGS. 23A to 23C was used in Comparative Example 4. As with Comparative Example 3, the protecting device according to Comparative Example 4 also includes a rectangular heat-generator lead-out electrode (width: 0.21). The difference from Comparative Example 3 is that in the protecting device according to Comparative Example 4, the heat-generator lead-out electrode does not overlap the heat-generator (Q=0.00). In addition, in Comparative Example 4, the distance D between the distal end portion of the heat-generator lead-out electrode and the heat-generator feeding electrode is 0.04.

TABLE 4

| applied voltage[V] | | Ex. 2 (FIG. 10) | Comp. 3 (FIG. 26) | Comp. 4 (FIG. 23) |
|---|---|---|---|---|
| 50 | spark | no | occur | no |
|  | rapid blowout | G | B | B |
| 100 | spark | no | occur | no |
|  | rapid blowout | G | B | B |
| 200 | spark | no | occur | no |
|  | rapid blowout | G | B | B |

Figure 24:
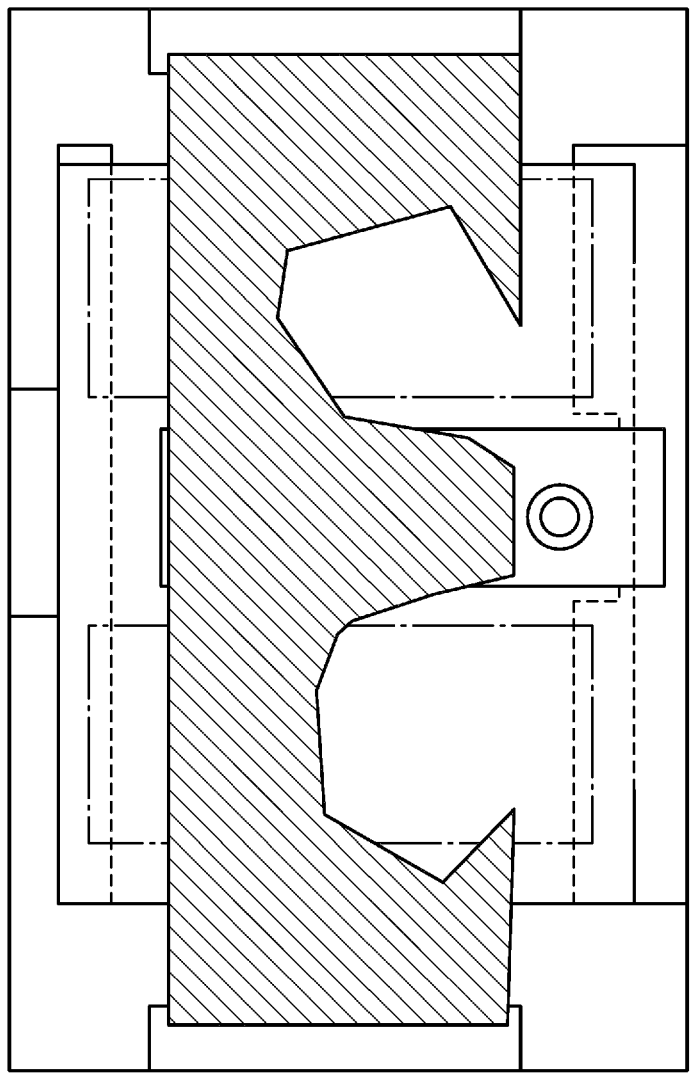
FIG. 24 is a plan view illustrating a state in which the fuse element remains unmelted and is not blown in the protecting device according to the comparative example.

As shown in Table 4, in Example 2, no spark was generated when any voltage was applied, and the fuse element could be blown within the predetermined time. On the contrary, in Comparative Example 3, a spark was generated when voltages of 100V and 200V were applied, and the fuse element could not be blown within the predetermined time. In Comparative Example 4, although no spark was generated when any voltage was applied, since a rectangular heat-generator lead-out electrode having a narrow width of 0.21 was used, the capacity for holding the melted conductor of the fuse element was insufficient, and as shown in FIG. 24, the melted conductor continued between the first and second electrodes, and the fuse element could not be blown within the predetermined time.

DESCRIPTION OF REFERENCE CHARACTERS 1 protecting device, 2 insulating substrate, 2a front surface, 2b rear surface, 3 fuse element, 3a melted conductor, 4 heat-generator, 4a overhang portion, 5 heat-generator feeding electrode, 5a third external connection electrode, 6 insulating layer, 7 heat-generator lead-out electrode, 7a distal end portion, 7b distal end portion, 8 heat-generator electrode, 9 connection solder, 11 first electrode, 11a first external connection electrode, 12 second electrode, 12a second external connection electrode, 13 low melting point metal layer, 14 high melting point metal layer, 17 regulating wall, 20 battery pack, 20a positive electrode terminal, 20b negative electrode terminal, 21a to 21d battery cell, 22 charging device, 23 current control element, 24 control unit, 25 battery stack, 26 charge/discharge control circuit, 27 detection circuit, 28 current control element, 30 protecting device, 32 holding electrode, 33 through-hole, 34 conductive layer, 40 protecting device, 41 supporting electrode, 42 through-hole, 43 blow-out member, 44 conductive layer, 45 auxiliary electrode, 46 first electrode terminal, 47 second electrode terminal, 48 third electrode terminal

What is claimed is:

1. A protecting device, comprising:
an insulating substrate;
a fuse element provided at one side of the insulating substrate;
a heat-generator formed on the insulating substrate to blow the fuse element by heat generation;
a heat-generator feeding electrode connected to one end of the heat-generator and serving as a power-feeding terminal for the heat-generator;
an insulating layer that covers the heat-generator; and
a heat-generator lead-out electrode connected to the other end of the heat-generator, formed along the heat-generator on the insulating layer to hold melted conductor of the fuse element,
wherein, when the heat-generator is energized via the heat-generator feeding electrode, the heat-generator feeding electrode side thereof works as a high potential portion and the heat-generator lead-out electrode side thereof works as a low potential portion, and
wherein, in the heat-generator lead-out electrode, an overlapping area in which a distal end portion extending in the high potential portion side of the heat-generator overlaps the heat-generator is smaller than an overlapping area in which a proximal end portion extending in the low potential portion side of the heat-generator overlaps the heat-generator, and
wherein the fuse element is mounted on the heat-generator lead-out electrode, and
wherein the distal end portion of the heat-generator lead-out electrode does not protrude from the side edge of the fuse element toward the heat-generator feeding electrode.

2. The protecting device according to claim 1, wherein, when a direction perpendicular to the conduction direction of the heat-generator is defined as a direction of width, in the heat-generator lead-out electrode, the width of the distal end portion is narrower than the width of the proximal end portion.

3. The protecting device according to claim 2, wherein, in an assumed region in which the distal end portion is assumed to have a width equal to that of the proximal end portion, the overlapping area that overlaps the heat-generator is narrower than the non-overlapping area that does not overlap the heat-generator.

4. The protecting device according to claim 1, wherein, in the heat-generator lead-out electrode, the area of the distal end portion is smaller than the area of the proximal end portion.

5. The protecting device according to claim 1, wherein the entire of the distal end portion of the heat-generator lead-out electrode overlaps the heat-generator.

6. The protecting device according to claim 4, wherein the entire of the distal end portion of the heat-generator lead-out electrode overlaps the heat-generator.

7. The protecting device according to claim 1, wherein a plurality of the heat-generators are arranged in parallel and spaced apart from each other on the insulating substrate.

8. The protecting device according to claim 7,
wherein, in the heat-generator lead-out electrode, the distal end portion is formed on a region between the two heat-generators, and
wherein the distal end portion does not overlap the two heat-generators.

9. The protecting device according to claim 7, wherein, in the heat-generator lead-out electrode, the distal end portion is formed on a region between the two heat-generators, and a part of the distal end portion overlaps at least one of the heat-generators.

10. The protecting device according to claim 7,
wherein the other side of the insulating substrate opposite to the one side of the insulating substrate is provided with a holding electrode that holds melted conductor of the fuse element,
wherein the heat-generator lead-out electrode and the holding electrode are continuous through a through-hole penetrating the insulating substrate, and
wherein the insulating substrate sucks the melted conductor of the fused element to the holding electrode side through the through-hole.

11. The protecting device according to claim 7,
wherein, in the insulating substrate, the heat-generator, the heat-generator feeding electrode, and the heat-generator lead-out electrode are formed on the other side opposite to the one side of the insulating substrate provided with the fuse element,
wherein the one side of the insulating substrate is provided with a supporting electrode for supporting the fuse element,
wherein the heat-generator lead-out electrode and the supporting electrode are continuous through a through-hole penetrating through the insulating substrate, and
wherein the insulating substrate constitutes a blow-out member for sucking the melted conductor of the melted fuse element to the heat-generator lead-out electrode side through the through-hole.

12. The protecting device according to claim 11, wherein the fuse element is held between a plurality of the blow-out members.

13. The protecting device according to claim 1, wherein the voltage applied to the heat-generator feeding electrode is 100V or more.

* * * * *